(12) United States Patent
Nishi et al.

(10) Patent No.: US 10,783,672 B2
(45) Date of Patent: Sep. 22, 2020

(54) MAKEUP PART GENERATING APPARATUS, MAKEUP PART UTILIZING APPARATUS, MAKEUP PART GENERATING METHOD, MAKEUP PART UTILIZING METHOD, NON-TRANSITORY COMPUTER-READABLE RECORDING MEDIUM STORING MAKEUP PART GENERATING PROGRAM, AND NON-TRANSITORY COMPUTER-READABLE RECORDING MEDIUM STORING MAKEUP PART UTILIZING PROGRAM

(71) Applicant: Panasonic Intellectual Property Management Co., Ltd., Osaka (JP)

(72) Inventors: Chie Nishi, Kanagawa (JP); Sachiko Takeshita, Tokyo (JP); Rieko Asai, Osaka (JP); Hiroki Taoka, Kyoto (JP); Masayo Shinoda, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 33 days.

(21) Appl. No.: 15/988,479

(22) Filed: May 24, 2018

(65) Prior Publication Data
US 2018/0268572 A1   Sep. 20, 2018

Related U.S. Application Data

(63) Continuation of application No. PCT/JP2016/004990, filed on Nov. 29, 2016.

(30) Foreign Application Priority Data

Dec. 25, 2015  (JP) .................................. 2015-254174

(51) Int. Cl.
*G06T 11/00* (2006.01)
*A45D 44/00* (2006.01)
(Continued)

(52) U.S. Cl.
CPC ............ *G06T 11/001* (2013.01); *A45D 44/00* (2013.01); *A45D 44/005* (2013.01);
(Continued)

(58) Field of Classification Search
CPC ................. A45D 44/002; A45D 44/005; A45D 2044/0077; G06T 11/001; G06T 19/006
See application file for complete search history.

(56) References Cited

U.S. PATENT DOCUMENTS 7,817,159 B2 * 10/2010 Schuster ............... G06T 11/001
345/442
2009/0231356 A1 * 9/2009 Barnes .................. G06F 3/0482
345/594

(Continued)

FOREIGN PATENT DOCUMENTS

JP    2004-094917    3/2004
JP    2005-044283    2/2005
(Continued)

OTHER PUBLICATIONS

International Search Report of PCT application No. PCT/JP2016/004990 dated Feb. 7, 2017.

(Continued)

*Primary Examiner* — William A Beutel
(74) *Attorney, Agent, or Firm* — Greenblum & Bernstein, P.L.C.

(57) ABSTRACT

A makeup part generating apparatus includes a drawing receiver that receives a drawing operation of a makeup part image that is to be overlaid on a facial image, an information acquiring unit that acquires, at each time point in a process of the drawing operation, a progress image that is an image drawn by the time point, and a drawing technique used at the time point, and an information processor that records and outputs makeup part information including, in a time-series (Continued)

manner, image information indicating the progress image, and technique information indicating at least one of the drawing technique and a makeup technique that is an application technique of a cosmetic corresponding to the drawing technique.

18 Claims, 16 Drawing Sheets

(51) Int. Cl.
  *G06K 9/00* (2006.01)
  *G06T 7/73* (2017.01)
  *G06T 11/60* (2006.01)

(52) U.S. Cl.
  CPC ..... *G06K 9/00268* (2013.01); *G06K 9/00281* (2013.01); *G06T 7/73* (2017.01); *G06T 11/60* (2013.01)

(56) References Cited

U.S. PATENT DOCUMENTS

| | | | | |
|---|---|---|---|---|
| 2012/0223956 | A1* | 9/2012 | Saito | A45D 44/005 345/582 |
| 2013/0229391 | A1* | 9/2013 | Diverdi | G06F 3/03545 345/179 |
| 2013/0257812 | A1* | 10/2013 | Wang | G06F 3/043 345/175 |
| 2016/0125624 | A1* | 5/2016 | Liu | G06K 9/00288 345/593 |
| 2017/0256084 | A1* | 9/2017 | Iglehart | G06K 9/00221 |

FOREIGN PATENT DOCUMENTS

| | | |
|---|---|---|
| JP | 2009-064423 | 3/2009 |
| JP | 2010-017360 | 1/2010 |

OTHER PUBLICATIONS

The Extended European Search Report dated Apr. 5, 2019 for the related European Patent Application No. 16877946.0.

* cited by examiner

FIG. 7
| APPLICATION WIDTH (531) | BRUSH IMAGE (532) | APPLICATION TOOL NAME (533) |
|---|---|---|
| W1 | 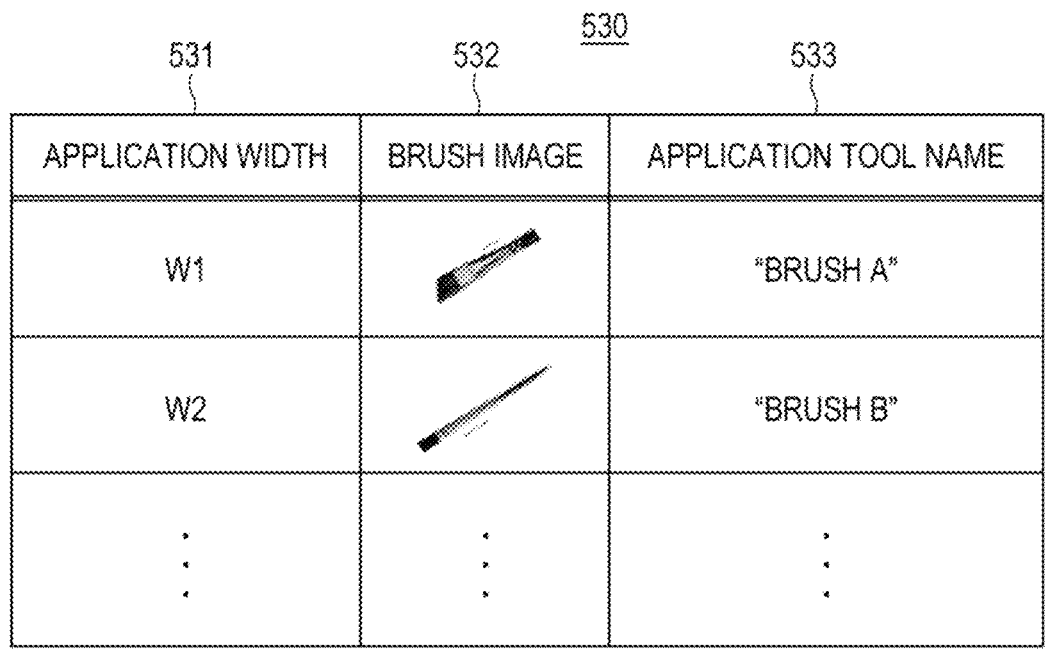 | "BRUSH A" |
| W2 |  | "BRUSH B" |
| ⋮ | ⋮ | ⋮ |
530
FIG. 8
| PRESENTATION START TIMING (541) | FIXED GUIDANCE PHRASE (CASE OF PEN PRESSURE ⇒ APPLICATION WIDTH) (542) |
|---|---|
| START OF DRAWING | "START MAKEUP WITH <DRAWING TOOL NAME>" |
| CHANGE OF DRAWING TOOL | "SWITCH BRUSH TO <DRAWING TOOL NAME>" |
| ⋮ | ⋮ |
540

FIG. 10

| NUMBER OF TIMES OF APPLICATION | BRUSH IMAGE | APPLICATION TOOL NAME |
|---|---|---|
| 3 |  | "BRUSH A" |
| 5 |  | "BRUSH B" |
| ⋮ | ⋮ | ⋮ |

FIG. 11

| PRESENTATION START TIMING | FIXED GUIDANCE PHRASE (CASE OF PEN PRESSURE ⇒ NUMBER OF TIMES OF APPLICATION) |
|---|---|
| START OF DRAWING | "OVER-PAINT THIS PORTION <NUMBER OF TIMES OF APPLICATION> TIMES" |
| CHANGE IN NUMBER OF TIMES OF APPLICATION | "OVER-PAINT THIS PORTION <NUMBER OF TIMES OF APPLICATION> TIMES" |
| ⋮ | ⋮ |

FIG. 13

| PART ID 611 | ITEM INFORMATION 612 | ORDER INFORMATION 613 | PART IMAGE 614 | COLOR INFORMATION (R, G, B, α) 615 | NAVIGATION PART IMAGE 616 | POSITIONAL INFORMATION (RP1, RP2, RP3) 617 | COSMETICS INFORMATION (PRODUCT ID, NAME) 618 | USER INFORMATION (CREATOR, EXPIRATION DATE, EDITABILITY) 619 |
|---|---|---|---|---|---|---|---|---|
| PID1 | EYE BROW | 1 | eyebrow01.png | R1, G1, B1, α1 | eyebrowN01.png | (x11, y11), (x12, y12), (x13, y13) | AID1, AN1 | UID1, VD1, EA0 |
| PID9 | BLUSHER | 2 | cheek01.png | R9, G9, B9, α9 | cheekN01.png | (x91, y91), (x92, y92), (x93, y93) | AID9, AN9 | UID3, VD3, EA0 |
| ... | ... | ... | ... | ... | ... | ... | ... | ... |

| TIME POINT 621 | PROGRESS IMAGE 622 | BRUSH INFORMATION 623 | | GUIDANCE INFORMATION 624 |
|---|---|---|---|---|
| t₁ | | BRUSH A | (x1, y1) | "START MAKEUP WITH BRUSH A" |
| t₂ | | — | (x2, y2) | "SWITCH BRUSH TO BRUSH B" |
| t₃ | | BRUSH B | (x3, y3) | |

620

MAKEUP PART GENERATING APPARATUS, MAKEUP PART UTILIZING APPARATUS, MAKEUP PART GENERATING METHOD, MAKEUP PART UTILIZING METHOD, NON-TRANSITORY COMPUTER-READABLE RECORDING MEDIUM STORING MAKEUP PART GENERATING PROGRAM, AND NON-TRANSITORY COMPUTER-READABLE RECORDING MEDIUM STORING MAKEUP PART UTILIZING PROGRAM

BACKGROUND

1. Technical Field

The present disclosure relates to a makeup part generating apparatus, a makeup part utilizing apparatus, a makeup part generating method, a makeup part utilizing method, a non-transitory computer-readable recording medium storing a makeup part generating program, and a non-transitory computer-readable recording medium storing a makeup part utilizing program that generate or utilize a makeup part image to be overlaid on a facial image.

2. Description of the Related Art

Conventionally, there exist techniques of generating a simulation image by overlaying, on a facial image, a makeup part image representing makeup (cosmetics) applied onto a face (for example, see PTLs 1 to 3). An image to be overlaid on the facial image (hereinafter, such an image will be referred to as "makeup part image") is generated for each makeup item such as an eyeshadow or a blusher. The makeup part image is generated, for example, by performing drawing on each facial part on a display with a touch panel where a facial image is displayed.

For example, a makeup part image generated by a professional makeup artist tends to be popular for its aesthetic appeal or for being fashionable. Such a highly popular makeup part image easily causes a third person to want to actually apply, on the face, the same makeup as the makeup represented by the image.

CITATION LIST

Patent Literature

PTL 1: Unexamined Japanese Patent Publication No. 2004-094917

PTL 2: Unexamined Japanese Patent Publication No. 2009-064423

PTL 3: Unexamined Japanese Patent Publication No. 2010-017360

However, some makeup part images are generated by a drawing technique requiring a high skill, and it is difficult for a third person to precisely reproduce the makeup represented by such an image.

SUMMARY

One non-limiting and exemplary embodiment provides a makeup part generating apparatus and a makeup part utilizing apparatus that enable a third person to more precisely reproduce makeup represented by a makeup part image.

In one general aspect, the techniques disclosed here feature a makeup part generating apparatus including a drawing receiver that receives a drawing operation of a makeup part image that is to be overlaid on a facial image, an information acquiring unit that acquires, at each time point in a process of the drawing operation, a progress image that is an image drawn by the time point, and a drawing technique used at the time point, and an information processor that records/outputs makeup part information including, in a time-series manner, image information indicating the progress image, and technique information indicating at least one of the drawing technique and a makeup technique that is an application technique of a cosmetic corresponding to the drawing technique.

According to the present disclosure, a third person is enabled to more precisely reproduce makeup represented by a makeup part image.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF DRAWINGS

FIG. 7 is a diagram showing an example of width/technique conversion information according to the present exemplary embodiment;

FIG. 8 is a diagram showing an example of width guidance presenting information according to the present exemplary embodiment;

FIG. 10 is a diagram showing an example of number-of-times/application-tool conversion information according to the present exemplary embodiment;

FIG. 11 is a diagram showing an example of number-of-times guidance presenting information according to the present exemplary embodiment;

FIG. 13 is a diagram showing an example of part information according to the present exemplary embodiment;

FIG. 14 is a diagram showing an example of time-series information according to the present exemplary embodiment;

DETAILED DESCRIPTION

In the following, an exemplary embodiment of the present disclosure will be described in detail with reference to the drawings.

System Overview

First, an overview of a makeup support system including a makeup part generating apparatus and a makeup part utilizing apparatus according to the present exemplary embodiment will be given.

Figure 1:
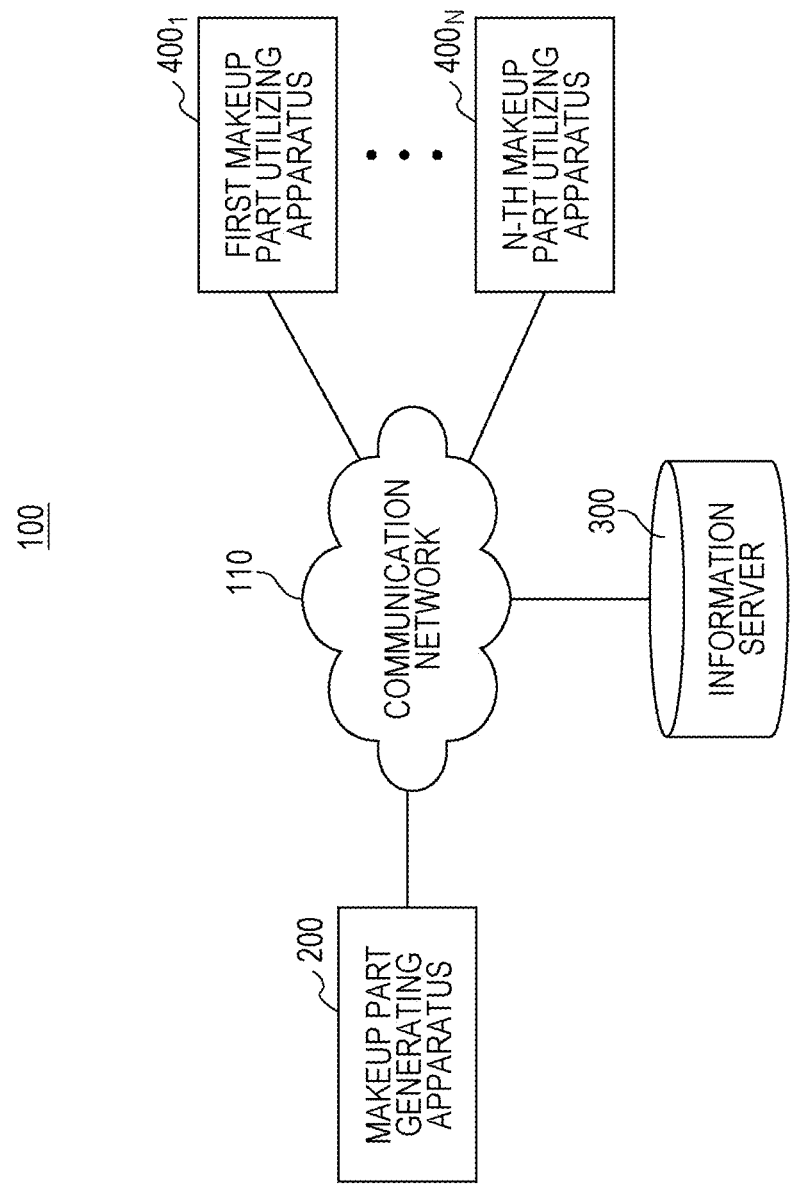
FIG. 1 is a system configuration diagram showing an exemplary configuration of a makeup support system according to a present exemplary embodiment.

FIG. 1 is a system configuration diagram showing an exemplary configuration of the makeup support system according to the present exemplary embodiment.

In FIG. 1, makeup support system 100 includes makeup part generating apparatus 200, information server 300, and a plurality of makeup part utilizing apparatuses 400 (400₁ to 400_N) which are communicably connected to each other over communication network 110 such as the Internet.

For example, makeup part generating apparatus 200 is a personal computer, including general-purpose drawing application software, to be used by a professional makeup designer. Makeup part generating apparatus 200 generates makeup part information in response to an operation of a makeup designer, and transmits (uploads) the generated makeup part information to information server 300.

The makeup part information is information defining a makeup part image, which is an image to be overlaid on a facial image. Details of the makeup part information will be given later. Additionally, information indicating the format of the makeup part information is shared in advance among makeup part generating apparatus 200, information server 300, and all the makeup part utilizing apparatuses 400.

Information server 300 receives, from makeup part generating apparatus 200, upload of the makeup part information generated by makeup part generating apparatus 200. Furthermore, information server 300 accepts download and use of the uploaded makeup part information by each makeup part utilizing apparatus 400.

Makeup part utilizing apparatus 400 accesses information server 300 and acquires the uploaded makeup part information, generates a makeup part image based on the acquired makeup part information, and overlays and displays the generated part image on a facial image. For example, makeup part utilizing apparatus 400 is an apparatus for generating a makeup simulation image (i.e., makeup simulator) which is installed at cosmetics shops and homes.

That is, a makeup part image generated by makeup part generating apparatus 200 can be shared and used by a large number of users such as sales assistants and individuals via communication network 110 and information server 300. Additionally, there may be a plurality of makeup part generating apparatuses 200, and information server 300 may be integrated with one of makeup part generating apparatuses 200.

Configuration of Apparatuses

Next, a description will be given of the configuration of each apparatus.

Figure 2:
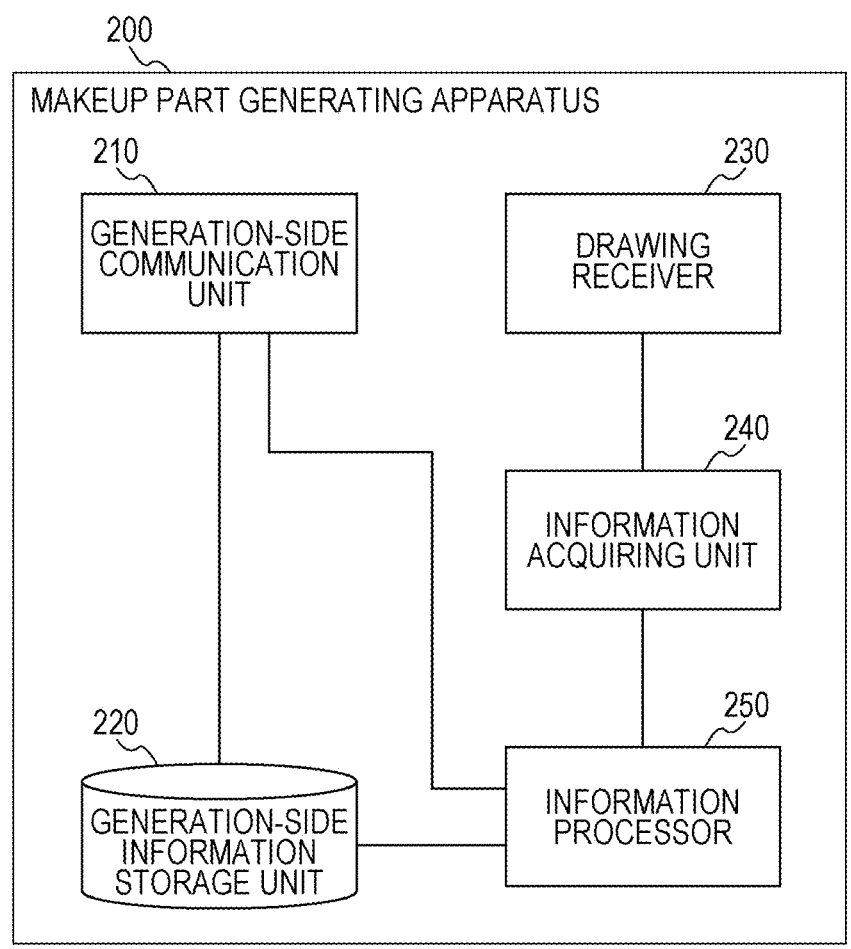
FIG. 2 is a block diagram showing an exemplary configuration of a makeup part generating apparatus according to the present exemplary embodiment.

FIG. 2 is a block diagram showing an exemplary configuration of makeup part generating apparatus 200.

In FIG. 2, makeup part generating apparatus 200 includes generation-side communication unit 210, generation-side information storage unit 220, drawing receiver 230, information acquiring unit 240, and information processor 250.

Generation-side communication unit 210 is communicably connected to at least information server 300 over communication network 110.

Generation-side information storage unit 220 stores information necessary for operation of each unit of makeup part generating apparatus 200, and information generated as a result of such operation.

For example, drawing receiver 230 includes a user interface such as a display with a stylus and a touch panel including a pen-pressure detection function. Furthermore, drawing receiver 230 includes drawing application software for receiving, via the user interface, drawing of a makeup part on a facial image which is prepared in advance, for example. Drawing receiver 230 displays a part image generating window, and receives such drawing operation. Details of the part image generating window will be given later.

Drawing receiver 230 outputs, to information acquiring unit 240, item information indicating the type of a makeup part (eyeshadow, blusher, etc.) which is the target of drawing, based on an operation performed. Moreover, while a drawing operation is being performed, drawing receiver 230 outputs, to information acquiring unit 240, every predetermined period of time (such as 33 milliseconds), drawing operation information indicating the process (drawing progress status) of the drawing operation of a makeup part image which is to be overlaid on a facial image (hereinafter, such an operation will be referred to simply as "drawing operation"). For example, the drawing operation information includes drawing position information indicating a position which is the target of drawing, drawing tool information indicating the type of a drawing tool which is virtual and which is used for drawing (hereinafter, such a tool will be referred to as "virtual drawing tool"), and pen pressure information indicating a pen pressure. Additionally, types of virtual drawing tool include, in addition to drawing tools having a function of applying color, such as a brush and a pen, a drawing tool having a function of erasing the color, such as an erasure. Furthermore, a position which is the target of drawing is defined by a coordinate system of a liquid crystal display with a touch panel, for example.

Information acquiring unit 240 acquires, based on the drawing operation information output from drawing receiver 230, at each time point during the process of the drawing operation (for example, every predetermined period of time as mentioned above), a progress image which is an image which has been drawn by that time point, and a drawing technique used at that time point. Then, information acquiring unit 240 outputs, to information processor 250, item information, and the progress image and the drawing technique at each time point acquired in correspondence with the item information.

The progress image is a provisional makeup part image at each stage of a makeup part drawing operation, and includes an image of a makeup part which is being drawn and an image of a makeup part drawing of which is completed. Information acquiring unit 240 determines, based on the pen pressure, at each time point, at least one of a width and a denseness of an image portion drawn at the time point. The drawing technique includes at least one of the type of a virtual drawing tool (drawing tool information), the pen pressure at the time of operation of a virtual drawing tool, and a pen movement (touch, speed, acceleration, etc.) at the time of operation of the virtual drawing tool.

Information processor 250 records, in generation-side information storage unit 220, makeup part information including, in a time-series manner, image information indicating a progress image, and technique information indicating at least one of a drawing technique and a makeup technique, which is an application technique of a cosmetic, corresponding to the drawing technique. Alternatively, information processor 250 uploads (transmits, outputs) the makeup part information to information server 300 via generation-side communication unit 210.

For example, the makeup technique includes at least one of the type of a makeup application tool (cosmetic brush, eyeshadow brush, etc.) to be used for application of a cosmetic and the number of times of over-painting of a cosmetic (hereinafter referred to as "number of times of application") which are associated in advance with at least one of the type of the virtual drawing tool, the pen pressure, and the pen movement. For example, in the case where the drawing technique acquired by information acquiring unit 240 includes the pen pressure, information processor 250 generates, based on the pen pressure, technique information indicating at least one of the type of the makeup application tool and the number of times of application.

Additionally, the image information includes positional information indicating a position in the progress image by using, as a reference, a facial feature point in a face, such as a corner of the mouth, an inner corner of an eye, or an outer corner of an eye. The position of a facial feature point in a facial image may be acquired by drawing receiver 230, information acquiring unit 240, or information processor 250 performing a known image analysis scheme such as pattern matching, or may be acquired by a manual input operation of a user of makeup part generating apparatus 200.

According to such a configuration, makeup part generating apparatus 200 may acquire the process (history) of drawing of a makeup part image, generate makeup part information indicating a progress image and a drawing technique/makeup technique in a time-series manner, and upload the makeup part information to information server 300.

Although not shown, information server 300 includes a server-side communication unit and a server-side information storage unit. The server-side communication unit is communicably connected to at least makeup part generating apparatus 200 and makeup part utilizing apparatus 400 over communication network 110. The server-side information storage unit stores the makeup part information transmitted from makeup part generating apparatus 200, and transmits, to makeup part utilizing apparatus 400, a copy of the makeup part information to be stored, via the server-side communication unit.

According to such a configuration, information server 300 may enable the makeup part information generated by makeup part generating apparatus 200 to be shared among a plurality of makeup part utilizing apparatuses 400.

Figure 3:
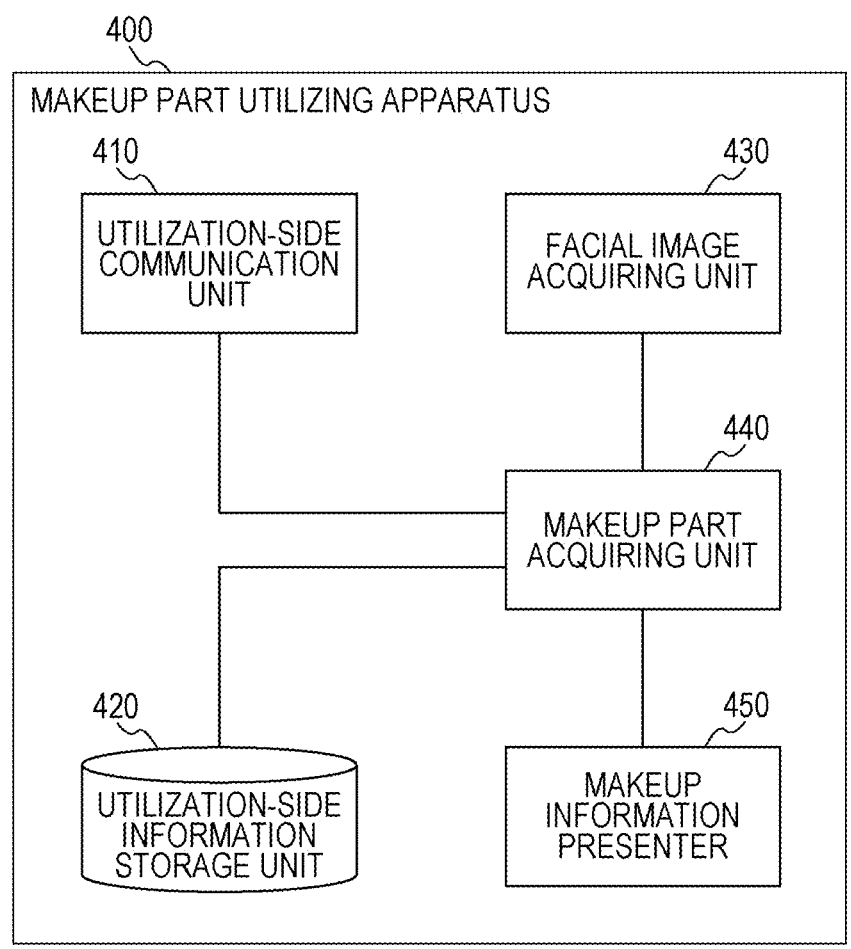
FIG. 3 is a block diagram showing an exemplary configuration of a makeup part utilizing apparatus according to the present exemplary embodiment.

FIG. 3 is a block diagram showing an exemplary configuration of makeup part utilizing apparatus 400.

In FIG. 3, makeup part utilizing apparatus 400 includes utilization-side communication unit 410, utilization-side information storage unit 420, facial image acquiring unit 430, makeup part acquiring unit 440, and makeup information presenter 450.

Utilization-side communication unit 410 is communicably connected to at least information server 300 over communication network 110.

Utilization-side information storage unit 420 stores information necessary for operation of each unit of makeup part utilizing apparatus 400, and information generated as a result of such operation.

For example, facial image acquiring unit 430 includes a video camera, and picks up a face which is the target of application of makeup which is based on a makeup simulation image. Furthermore, facial image acquiring unit 430 outputs an acquired facial image (facial video) to makeup part acquiring unit 440.

Makeup part acquiring unit 440 downloads (receives) makeup part information uploaded to information server 300, from information server 300 via utilization-side communication unit 410. Alternatively, makeup part acquiring unit 440 reads, from utilization-side information storage unit 420, makeup part information which has been stored in utilization-side information storage unit 420 from information server 300 via utilization-side communication unit 410. Then, makeup part acquiring unit 440 outputs the facial image and the acquired makeup part information to makeup information presenter 450.

For example, makeup information presenter 450 includes a liquid crystal display with a touch panel, and a speaker, and based on the makeup part information, makeup information presenter 450 overlays and displays a progress image on the facial image in a time-series manner, and presents the makeup technique in a time-series manner in conjunction with display of the progress image. For example, makeup information presenter 450 generates and outputs a makeup support window which outputs the makeup technique by audio while displaying a makeup simulation image obtained by overlaying the progress image on the facial image. Details of the makeup support window will be given later.

Additionally, makeup information presenter 450 determines a display position of the progress image based on the position of a facial feature point in the facial image and positional information of the progress image. The position of a facial feature point in the facial image may be acquired by facial image acquiring unit 430, makeup part acquiring unit 440, or makeup information presenter 450 performing a known image analysis scheme such as pattern matching, or may be acquired by a manual input operation of a user of makeup part utilizing apparatus 400.

According to such a configuration, information (the progress image and the makeup technique in time-series) indicating a process (history) of drawing of a makeup part image may be presented to a user based on the makeup part information uploaded to information server 300.

Although not shown in the drawings, the above-described apparatuses each include, for example, a central processing unit (CPU), a storage medium such as a read only memory (ROM) or a hard disk storing control programs, a work memory such as a random access memory (RAM), and a communication circuit. In this case, the functions of the above-described units are realized by the CPU executing the control programs.

Part Image Generating Window

The part image generating window that is displayed by makeup part generating apparatus 200 will be described below in detail.

Figure 4:
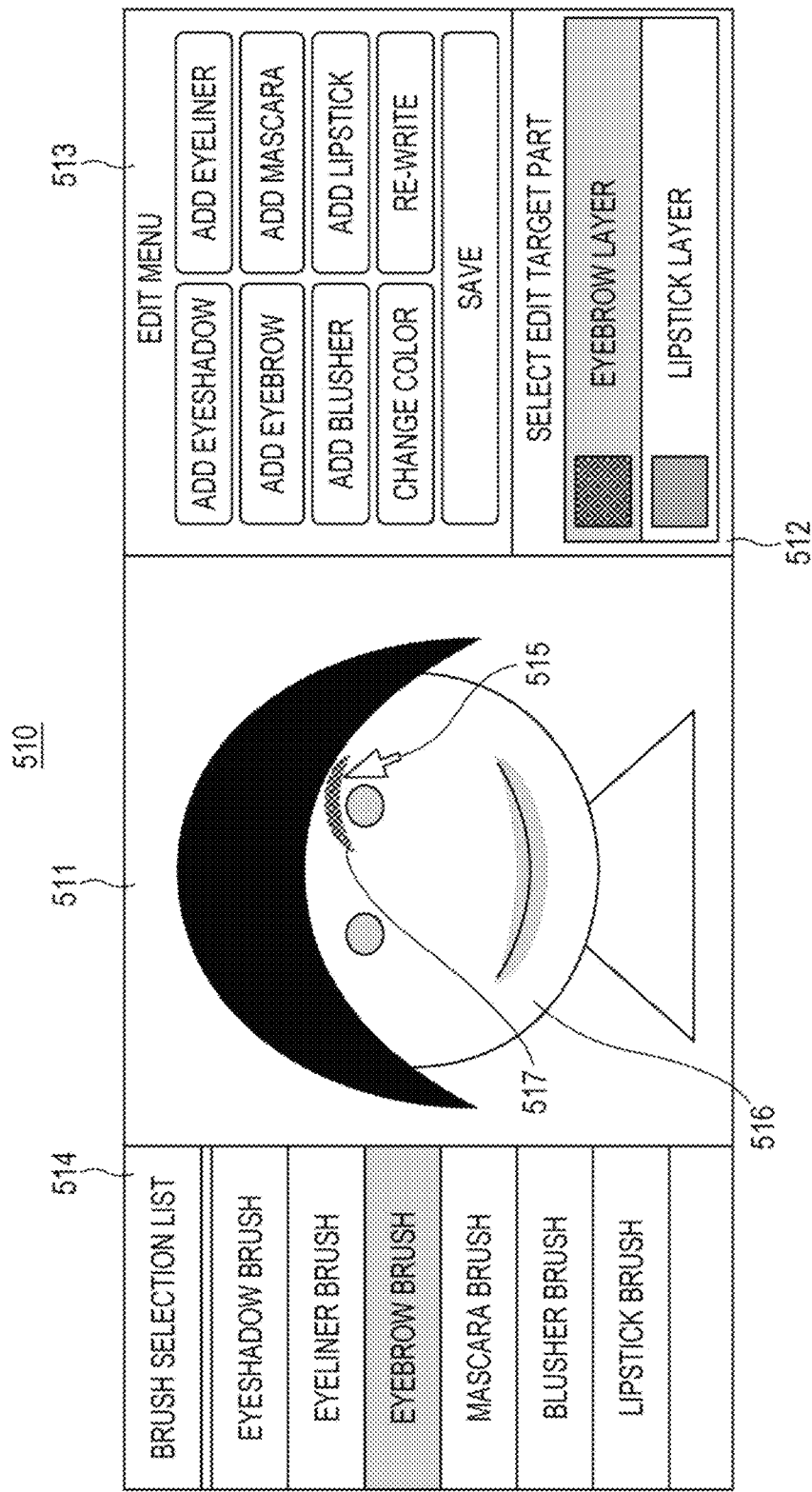
FIG. 4 is a plan view showing an example of a part image generating window according to the present exemplary embodiment.

FIG. 4 is a plan view showing an example of the part image generating window.

As shown in FIG. 4, part image generating window 510 includes facial image displaying region 511, edit target part selecting region 512, edit menu region 513, and brush selection list region 514. Furthermore, disposed on part image generating window 510 is cursor 515 with which a shifting operation and a clicking operation can be carried out via the touch panel mentioned above.

Facial image displaying region 511 displays facial image 516. Facial image 516 may be a facial image of a standard face generated by computer graphics or the like, or may be a facial image picked up by a digital camera, not shown. Drawing receiver 230 generates the drawing position information mentioned above based on the position of a facial feature point included in facial image 516 and the position of cursor 515.

Edit target part selecting region 512 receives selection of a makeup part which is the target of part image generation. Drawing receiver 230 generates the item information mentioned above based on an operation on edit target part selecting region 512.

Edit menu region 513 receives selection of an image operation, such as addition, editing, or storage of a part image.

Brush selection list region 514 receives selection of a virtual brush to be used for drawing a part image. Drawing receiver 230 generates the drawing tool information mentioned above based on an operation on brush selection list region 514.

Drawing receiver 230 generates progress image 517 of a corresponding makeup part image substantially in real time according to a detected pen pressure (such as a pressure on the touch panel from a stylus), that is, a drawing operation, and overlays progress image 517 on facial image 516. Drawing receiver 230 generates the pen pressure information mentioned above based on the detected pen pressure.

Additionally, for example, drawing receiver 230 generates progress image 517 in a sequential manner by generating a circular image of a color indicated by the drawing tool information, with the position indicated by the pen pressure information as the center and with the size or denseness according to the pen pressure indicated by the pen pressure information, and by logically ANDing images which have been generated since the start of drawing.

Figure 5:
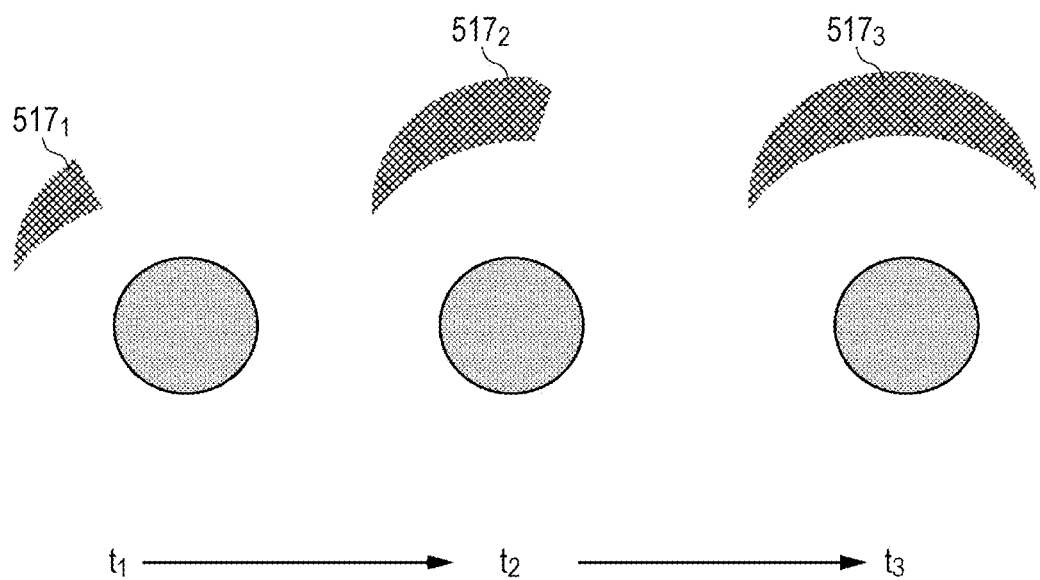
FIG. 5 is a diagram showing an example of a drawing process of a makeup part image according to the present exemplary embodiment.

FIG. 5 is a diagram showing an example of a drawing process of a makeup part image.

For example, it is assumed that a makeup part image of an eyebrow is drawn from time point $t_1$ to $t_3$, with the drawing start time point as a base time point. In this case, as shown in FIG. 5, progress images $517_1$ to $517_3$ at different drawing stages are generated at respective time points $t_1$ to $t_3$, and are displayed at respective time points, for example.

Additionally, which of the width and denseness of an image portion to be drawn is to reflect the pen pressure may be set in advance at drawing receiver 230, or may be set by a user through drawing receiver 230. For example, a pen (stylus) for touch panel input is provided with a switch or the like for receiving an operation for switching between an input mode in which the pen pressure is reflected in the width and an input mode in which the pen pressure is reflected in the denseness. In this case, drawing receiver 230 detects a switching operation by short-range communication, for example, and switches the input mode. Alternatively, drawing receiver 230 switches the input mode according to the type of the virtual drawing tool.

Furthermore, progress image 517 may be generated by information acquiring unit 240 or information processor 250, instead of drawing receiver 230.

Technique Conversion Information

In the case where the technique information is to be generated by information processor 250 based on the pen pressure, technique conversion information for converting the pen pressure to the technique information has to be stored in generation-side information storage unit 220 of makeup part generating apparatus 200.

First, a description will be given of the technique conversion information for a case where the pen pressure is to be reflected in the width (thickness; hereinafter referred to as "application width") of an application portion of a makeup application tool. In this case, the technique conversion information includes pen-pressure/width conversion information associating the pen pressure and the application width of a makeup application tool, width/technique conversion information associating the application width and the type of a makeup application tool, and width guidance presenting information specifying the manner of presentation of the technique information, for example.

Figure 6:
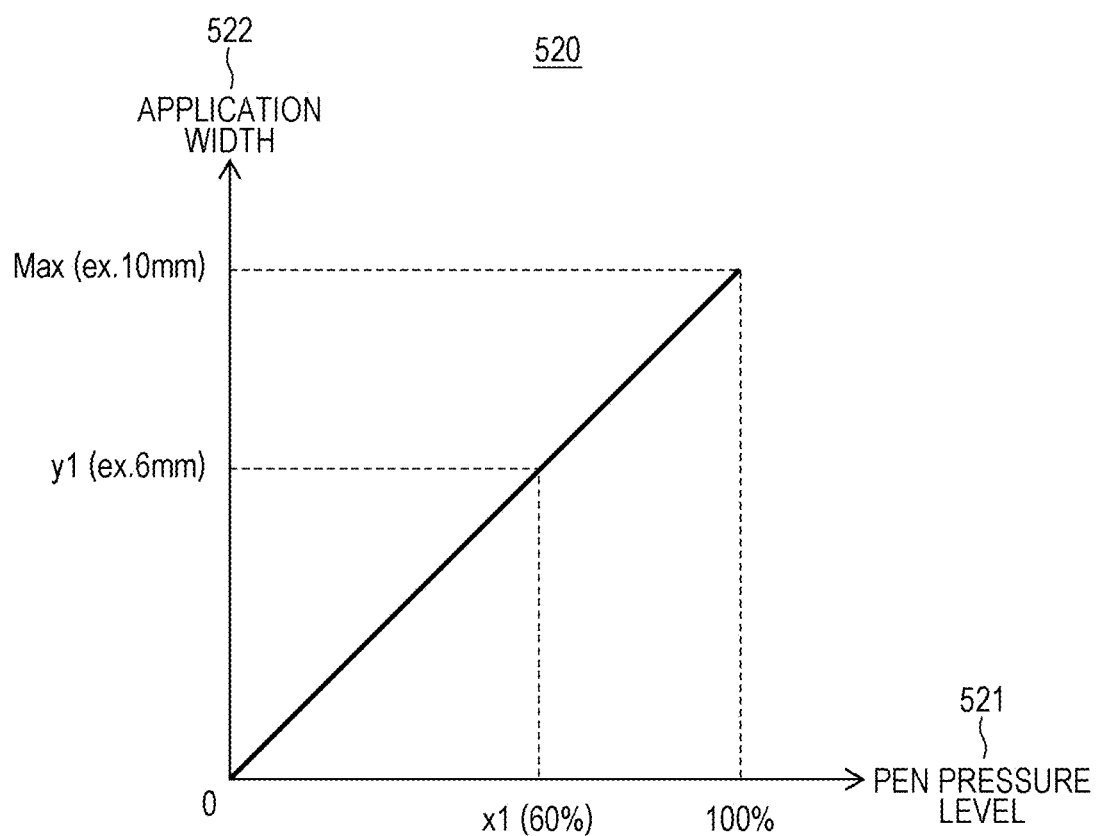
FIG. 6 is a diagram showing an example of pen-pressure/width conversion information according to the present exemplary embodiment.

FIG. 6 is a diagram showing an example of the pen-pressure/width conversion information.

As shown in FIG. 6, pen-pressure/width conversion information 520 describes, for each pen pressure level 521, application width 522, which is acquired in advance as the width of an application region of a cosmetic agent intended by a makeup designer. For example, when the maximum pen pressure level 521 that can be detected by the touch panel is given as 100%, application width 522 of "10 mm" is associated with pen pressure level 521 of "100%". Furthermore, application width 522 of "6 mm" is associated with pen pressure level 521 of "60%". Additionally, pen pressure level 521 may be defined as a pressure value or the like. Moreover, application width 522 may be defined as the number of pixels or the number of points in the window, for example.

Additionally, the relationship between pen pressure level 521 and application width 522 is not limited to a linear relationship (monotonic increase) as shown in FIG. 6, and may be a non-linear relationship according to which the rate of increase in the application width is reduced as the pen pressure is increased, for example.

FIG. 7 is a diagram showing an example of the width/technique conversion information.

As shown in FIG. 7, width/technique conversion information 530 describes, for each application width 531, brush image 532 and application tool name 533 to be presented at makeup part utilizing apparatus 400. Additionally, application width 531 may be numerical values ranging from 1 mm to 7 mm, for example. For example, brush image 532 of a wide cosmetic brush and application tool name 533 of "brush A" are associated with application width 531 of "W1".

Additionally, width/technique conversion information 530 may be prepared for each makeup item. In this case, for example, brush image 532 and application tool name 533 corresponding to a large brush or a puff may be used for foundation or blusher. Moreover, brush image 532 and application tool name 533 corresponding to a small brush or a fingertip, a thin pen, and a predetermined brush-shaped tool may be used, respectively, for eyeshadow, eyeliner, and mascara.

FIG. 8 is a diagram showing an example of the width guidance presenting information.

As shown in FIG. 8, width guidance presenting information 540 describes fixed guidance phrase 542 for each timing 541 of start of presentation of the technique information (hereinafter, such a timing will be referred to as "presentation start timing"). For example, fixed guidance phrase 542 of "start makeup with <drawing tool name>" is associated with presentation start timing 541 of "start of drawing". Corresponding application tool name 533 (see FIG. 7) is to be inserted in "<drawing tool name>".

Next, a description will be given of the technique conversion information for a case where the pen pressure is to be reflected in the number of times of application by a makeup application tool. In this case, the technique conversion information includes pen-pressure/number-of-times conversion information associating the pen pressure and the number of time of application by a makeup application tool, number-of-times/application-tool conversion information associating the number of times of application and the type of a makeup application tool, and number-of-times guidance presenting information specifying the manner of presentation of the technique information, for example.

Figure 9:
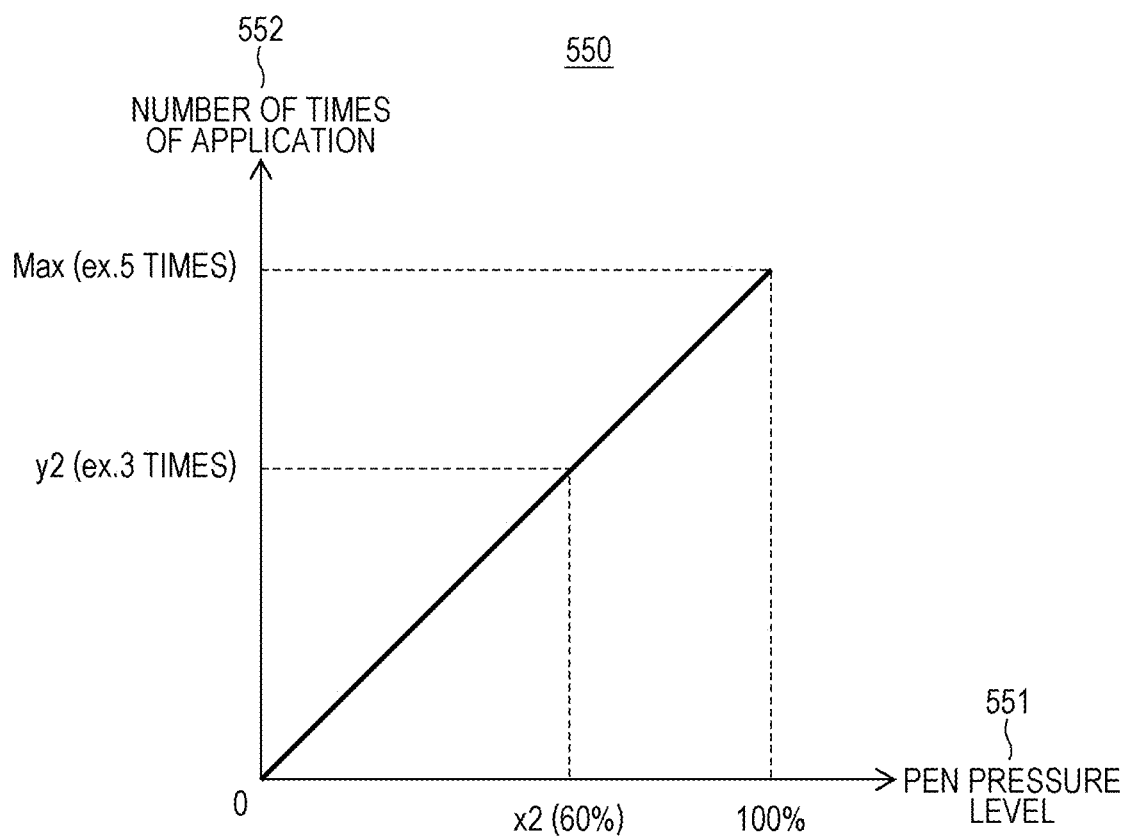
FIG. 9 is a diagram showing an example of pen-pressure/number-of-times conversion information according to the present exemplary embodiment.

FIG. 9 is a diagram showing an example of the pen-pressure/number-of-times conversion information.

As shown in FIG. 9, pen-pressure/number-of-times conversion information 550 describes, for each pen pressure level 551, the number of times of application 552, which is acquired in advance as the number of times of over-painting which is necessary to achieve the denseness of a cosmetic agent intended by a makeup designer. For example, when the maximum pen pressure level 551 that can be detected by the touch panel is given as 100%, the number of times of application 552 of "5 times" is associated with pen pressure level 551 of "100%", and the number of times of application 552 of "3 times" is associated with pen pressure level 551 of "60%". Additionally, pen pressure level 551 may be defined as a pressure value or the like.

Additionally, the number of times of over-painting which is necessary to achieve a predetermined denseness is different depending on the type of a cosmetic, due to a difference in the viscosity or the coefficient of friction of cosmetics. Accordingly, pen-pressure/number-of-times conversion information 550 is desirably prepared for each type of cosmetic item. For example, in the case where the viscosity or the coefficient of friction of a cosmetic is high, the cosmetic tends to stay on the skin after being applied, and thus, the number of times of application may be reduced compared to a case where the viscosity or the coefficient of friction is low. In this manner, in the pen-pressure/number-of-times conversion, the viscosity or the coefficient of friction of a cosmetic may be used for calculation of the number of times of an action of spreading or blurring the applied cosmetic.

Furthermore, the relationship between pen pressure level 551 and the number of times of application 552 is not limited to a linear relationship (monotonic increase) as shown in FIG. 9, and may be a non-linear relationship according to which the rate of increase in the number of times of application is reduced as the pen pressure is increased, for example.

FIG. 10 is a diagram showing an example of the number-of-times/application-tool conversion information.

As shown in FIG. 10, number-of-times/application-tool conversion information 560 describes, for each number of times of application 561, brush image 562 and application tool name 563 to be presented at makeup part utilizing apparatus 400. For example, brush image 562 of a slim cosmetic brush and application tool name 563 of "brush A" are associated with the number of times of application 561 of "3".

FIG. 11 is a diagram showing an example of the number-of-times guidance presenting information.

As shown in FIG. 11, number-of-times guidance presenting information 570 describes fixed guidance phrase 572 for each timing 571 of start of presentation of the technique information (hereinafter, such a timing will be referred to as "presentation start timing"). For example, fixed guidance phrase 572 of "over-paint this portion <number of times of application> times" is associated with presentation start timing 571 of "start of drawing". Corresponding number of times of application 561 (see FIG. 10) is to be inserted in "<number of times of application>".

Operations of Apparatuses

Next, a description will be given of the operations of the apparatuses. A case where the pen pressure is reflected in the application width will be described as an example.

Figure 12:
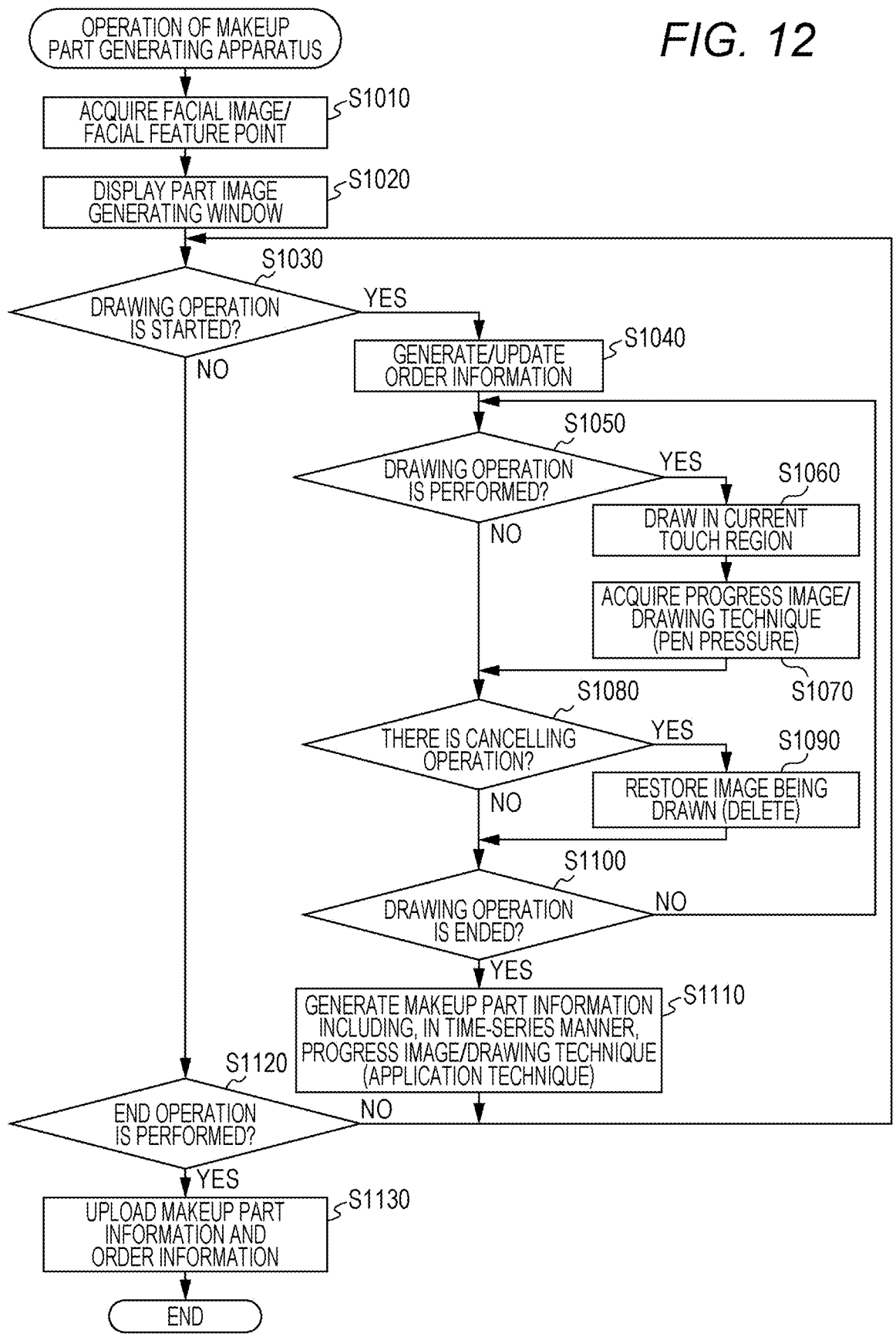
FIG. 12 is a diagram showing a flowchart showing an exemplary operation of the makeup part generating apparatus according to the present exemplary embodiment.

FIG. 12 is a flowchart showing an exemplary operation of makeup part generating apparatus 200.

In step S1010, drawing receiver 230 acquires a facial image which is the target of drawing of a makeup part image, and also, acquires a facial feature point included in the facial image and the position of the facial feature point.

In step S1020, drawing receiver 230 displays part image generating window 510 (see FIG. 4), and receives a drawing operation.

In step S1030, information acquiring unit 240 determines whether or not a drawing operation is started for any of makeup part images. For example, information acquiring unit 240 determines that a drawing operation is started, in a case where the stylus has contacted the touch panel at a predetermined pressure in a state where a drawing tool having a function of applying a color, such as a brush, is selected. In the case where a drawing operation is started (S1030: YES), information acquiring unit 240 proceeds to step S1040. In the case where a drawing operation is not started (S1030: NO), information acquiring unit 240 proceeds to step S1120 described later.

In step S1040, information processor 250 determines which makeup item is selected, and generates order information indicating a drawing order of a plurality of makeup parts for a case where a plurality of makeup parts are to be successively drawn. Additionally, in the case where the order information is already generated, information processor 250 updates the contents of the information as appropriate.

In step S1050, drawing receiver 230 determines whether or not a drawing operation is being performed. For example, drawing receiver 230 determines that a drawing operation is being performed, in a case where the stylus is in contact with the touch panel at a predetermined pressure in a state where a drawing tool having a function of applying a color, such as a brush, is selected. In the case where a drawing operation is being performed (S1050: YES), drawing receiver 230 proceeds to step S1060. Additionally, at the first time of proceeding to step S1050, drawing receiver 230 may directly proceed to step S1060 without performing the determination process. In the case where a drawing operation is not being performed (S1050: NO), drawing receiver 230 proceeds to step S1080 described later.

In step S1060, drawing receiver 230 performs drawing in a touch region where a current (latest) stylus is in contact with the touch panel.

In step S1070, information acquiring unit 240 acquires, and records, the progress image and the drawing technique (pen pressure), based on current (latest) drawing operation information.

In step S1080, drawing receiver 230 determines whether or not an operation of cancelling drawing (hereinafter referred to as "cancelling operation") is being performed. For example, drawing receiver 230 determines that a cancelling operation is being performed, in a case where the stylus is in contact with the touch panel at a predetermined pressure in a state where a drawing tool having a function of erasing a color, such as an erasure, is selected. In the case where a cancelling operation is being performed (S1080: YES), drawing receiver 230 proceeds to step S1090. In the case where a cancelling operation is not being performed (S1080: NO), drawing receiver 230 proceeds to step S1100 described later.

In step S1090, drawing receiver 230 restores the state of the image by going back to a time point when drawing was performed in a current (latest) touch region. Furthermore, information acquiring unit 240 deletes records of the progress image and the drawing technique (pen pressure) acquired after the time point.

In step S1100, drawing receiver 230 determines whether or not a drawing operation is ended for one makeup part. For example, drawing receiver 230 determines that a drawing operation is ended, in a case where a state where the stylus is not in contact with the touch panel at a predetermined pressure continues for a predetermined time or longer, in a case where a selected makeup item is switched, or in a case where an operation of selecting end of the drawing process is performed. In the case where a drawing operation for one makeup part is not ended (S1100: NO), drawing receiver 230 returns to step S1050. Additionally, in the case of repeating the processes from steps S1050 to S1100, makeup part generating apparatus 200 takes the predetermined period of time mentioned above as a repetition interval. In the case where a drawing operation for one makeup part is ended (S1100: YES), drawing receiver 230 proceeds to step S1110.

In step S1110, information processor 250 generates makeup part information including, in a time-series manner, the progress image and the drawing technique recorded by information acquiring unit 240. Note that information processor 250 converts the pen pressure to an application technique related to the application width by using pen-pressure/width conversion information 520, width/technique conversion information 530, and width guidance presenting information 540 (see FIGS. 6 to 8), and includes the application technique in the makeup part information. Then, information processor 250 returns to step S1030.

In step S1120, drawing receiver 230 determines whether or not an end operation is performed, the end operation indicating end of drawing of a makeup part image corresponding to one or more makeup parts (hereinafter referred to as "makeup set") which are to be collectively applied on a same face as makeup on one entire face. Such an end operation is an operation of clicking an "upload button" (not shown) which is displayed on part image generating window 510, for example. In the case where the end operation is not performed (S1120: NO), drawing receiver 230 returns to step S1030.

That is, every time a drawing operation for one makeup part image is started, makeup part generating apparatus 200 repeats the operation of steps S1040 to S1110, generates the makeup part information, and generates/updates the order information indicating the drawing order of the makeup part image.

In the case where the end operation is performed (S1120: YES), drawing receiver 230 proceeds to step S1130.

In step S1130, information processor 250 uploads (transmits), to information server 300, the makeup part information related to one makeup set which has been generated. Additionally, in the case where at least two makeup part images are drawn, information processor 250 includes the order information in the makeup part information.

By such an operation, makeup part generating apparatus 200 may generate the makeup part information based on a drawing operation of each makeup part image, and may enable the generated makeup part information to be shared.

In this manner, even in a case where a makeup designer has performed drawing while performing erroneous drawing operation or through trial and error, makeup part generating apparatus 200 may edit the drawing process, and generate makeup part information contents of which effectively support acquisition of a makeup technique or application of a makeup in a short time, for example.

Moreover, for example, in the case where a makeup part image of yellow blusher is drawn, and then, a makeup part image of pink blusher is drawn on top, makeup is desirably performed in the same order. Regarding this point, makeup part generating apparatus 200 may generate makeup part information which is capable of presenting the appropriate makeup order by including the order information.

Additionally, information processor 250 may edit the generated makeup part information and the order information before transmission. For example, in the case where a plurality of makeup parts are drawn simultaneously in parallel, that is, in the case where a drawing process for one makeup part is inserted in a drawing process for another makeup part, information processor 250 may merge information on a time axis such that the drawing process becomes continuous for each makeup part.

Furthermore, such a merge process or a process of removing an unnecessary drawing process may be manually performed by a user of makeup part generating apparatus 200 after a time-series makeup part information group including all the drawing processes (steps) is generated. Such a manual operation is realized by adopting a known authoring tool technique for editing contents with time information, for example.

Makeup Part Information

For example, the makeup part information includes part information indicating makeup part images for one makeup set and the order information, and time-series information indicating, in a time-series manner, the progress image at each time point in a drawing process of each makeup part image and the technique information.

FIG. 13 is a diagram showing an example of the part information. In FIG. 13, pieces of information in a row represent the contents of the part information of one makeup part.

As shown in FIG. 13, part information (group) 610 includes, for each makeup part in one makeup set, part ID 611, item information 612, order information (makeup temporal position information) 613, part image 614, color information 615, navigation part image 616, positional information 617, cosmetics information 618, and user information 619.

Part ID 611 is unique identification information of each makeup part to be generated by makeup support system 100. For example, part ID 611 is determined by drawing receiver 230 every time drawing of a new makeup part image is started in part image generating window 510 (see FIG. 4).

Item information 612 is information indicating the type of a makeup item. For example, item information 612 is determined by drawing receiver 230 in response to a makeup item selection operation of a user in part image generating window 510 (see FIG. 4).

Order information 613 is information indicating the order of application of makeup corresponding to a plurality of makeup items. For example, order information 613 is determined by drawing receiver 230 every time drawing of a new makeup part image is started in part image generating window 510 (see FIG. 4). Additionally, order information 613 may be identification information specifying, for each makeup item, a makeup item which is to be applied immediately before the aforementioned makeup item, or may be reference information indicating identification information specifying a makeup item which is to be applied immediately after the aforementioned makeup item.

Part image 614 is a makeup part image after completion of drawing, and is binary (black/white, brightness) data, for example. Additionally, part image 614 may be reference information for accessing image data, instead of being image data itself. Color information 615 is information indicating the color of a makeup part image and the manner of overlaying.

Navigation part image 616 is an auxiliary image showing an outer shape (application region) of a makeup part image by a broken line or the like. For example, navigation part image 616 is generated by information processor 250 by extracting an edge (contour) of makeup part image 614. Additionally, navigation part image 616 may also be reference information for accessing image data, instead of being image data itself. Moreover, navigation part image 616 is defined by a coordinate system (part image coordinate system) the same as that of part image 614.

Positional information 617 is coordinate values of a plurality of reference points, defined in advance for each type of makeup part, in a makeup part image and a navigation part image.

For example, part image 614, color information 615, navigation part image 616, and positional information 617 are generated by drawing receiver 230 every time drawing of a new makeup part image in part image generating window 510 (see FIG. 4) is completed.

Cosmetics information 618 is information indicating a cosmetic item to be used in realizing makeup corresponding to a makeup part. For example, cosmetics information 618 is generated by drawing receiver 230 by using a table associating a selectable virtual drawing tool (and color) and corresponding cosmetics information. Additionally, the cosmetics information may include information about the color, form, viscosity, and coefficient of friction of a cosmetic, an accessory such as a brush, and the like. Furthermore, the table mentioned above is stored in advance in generation-side information storage unit 220, for example.

User information 619 is information to be notified to the utilization side of a makeup part, such as the creator, expiration data, and editability of a makeup part image. For example, drawing receiver 230 receives input of user information 619 from a user from part image generating window 510 (see FIG. 4).

The relationship between a plurality of reference points defined in advance for each type of makeup part and respective facial feature points is defined in advance in such a way that, for example, in the case of eyeshadow, the reference points correspond to the position of the inner corner of an eye, the position of the outer corner of the eye, and the position of the highest point of the top lid. As described above, such definition is shared in advance, as information indicating the format of part information, among makeup part generating apparatus 200, information server 300, and all the makeup part utilizing apparatuses 400.

Accordingly, part information 610 generated by makeup part generating apparatus 200 can be used in a secondary manner by all the makeup part utilizing apparatuses 400 as appropriate.

FIG. 14 is a diagram showing an example of the time-series information. Time-series information 620 is generated for each makeup part image.

As shown in FIG. 14, time-series information 620 includes, for each time point 621 in the process of a drawing operation of a makeup part image, progress image 622, brush information 623, and guidance information 624.

Progress image 622 is an image of a part which has been drawn by the corresponding time point, and is binary (black/white, brightness) data, for example. For example, as described above, progress image 622 is generated by drawing receiver 230. Additionally, progress image 622 may be a still image frame, or may be an image which is held after being subjected to intra-frame compression or temporal compression, such as Motion JPEG or MPEG. Note that progress image 622 is held in a format which allows accurate reproduction of a reference point which is to be mapped on a facial feature point.

Brush information 623 is information about a makeup application tool (brush) which is to be used at a corresponding time point, and is information indicating the application tool name, a brush image, and a display position. For example, brush information 623 is generated by information processor 250 by using pen-pressure/width conversion information 520 (see FIG. 6) and width/technique conversion information 530 (see FIG. 7) described above.

Guidance information 624 is information indicating the contents of guidance which is to be presented at a corresponding time point. For example, guidance information 624 is generated by information processor 250 by using width guidance presenting information 540 (see FIG. 8) described above.

In the example shown in FIG. 14, time-series information 620 includes three different progress images 622 showing an eyebrow being gradually drawn from first to third time points $t_1$ to $t_3$. Furthermore, time-series information 620 includes guidance information 624 contents of which indicate that an application tool is to be moved from first to third time points $t_1$ to $t_3$, and that the makeup application tool to be used at second time point $t_2$ is to be changed from "brush A" to "brush B".

Part information (group) 610 for one or a plurality of makeup parts and time-series information 620 for each makeup part as described above are provided as the makeup part information to be used by makeup part utilizing apparatus 400.

Additionally, for example, color information 615, cosmetics information 618, and guidance information 624 may be determined or corrected by a manual operation of a user. Such a manual operation is realized by adopting a known authoring tool technique for editing additional information for contents with time information, for example.

Furthermore, information processor 250 may determine whether or not a predetermined time interval should be provided at a time of actually applying makeup on a plurality of makeup parts (including a case of the same makeup item), and may include time interval information indicating the predetermined time interval in the order information. For example, in the case where there is an instruction to apply, with respect to the same makeup item (same portion of the face), a second cosmetic after applying first cosmetic which is liquid, information processor 250 includes, in the order information, time interval information indicating that a predetermined period of time has to be passed until the first cosmetic is sufficiently dry. Additionally, information processor 250 may include the time interval information in the order information by performing insertion (WAIT) of a predetermined period of time in time-series information 620 at the time of returning from step S1110 to step S1030 in FIG. 12. Furthermore, information processor 250 may include, in time-series information 620, guidance information according to which a text or audio, such as "wait for 10 seconds", is output in the predetermined period of time.

Figure 15:
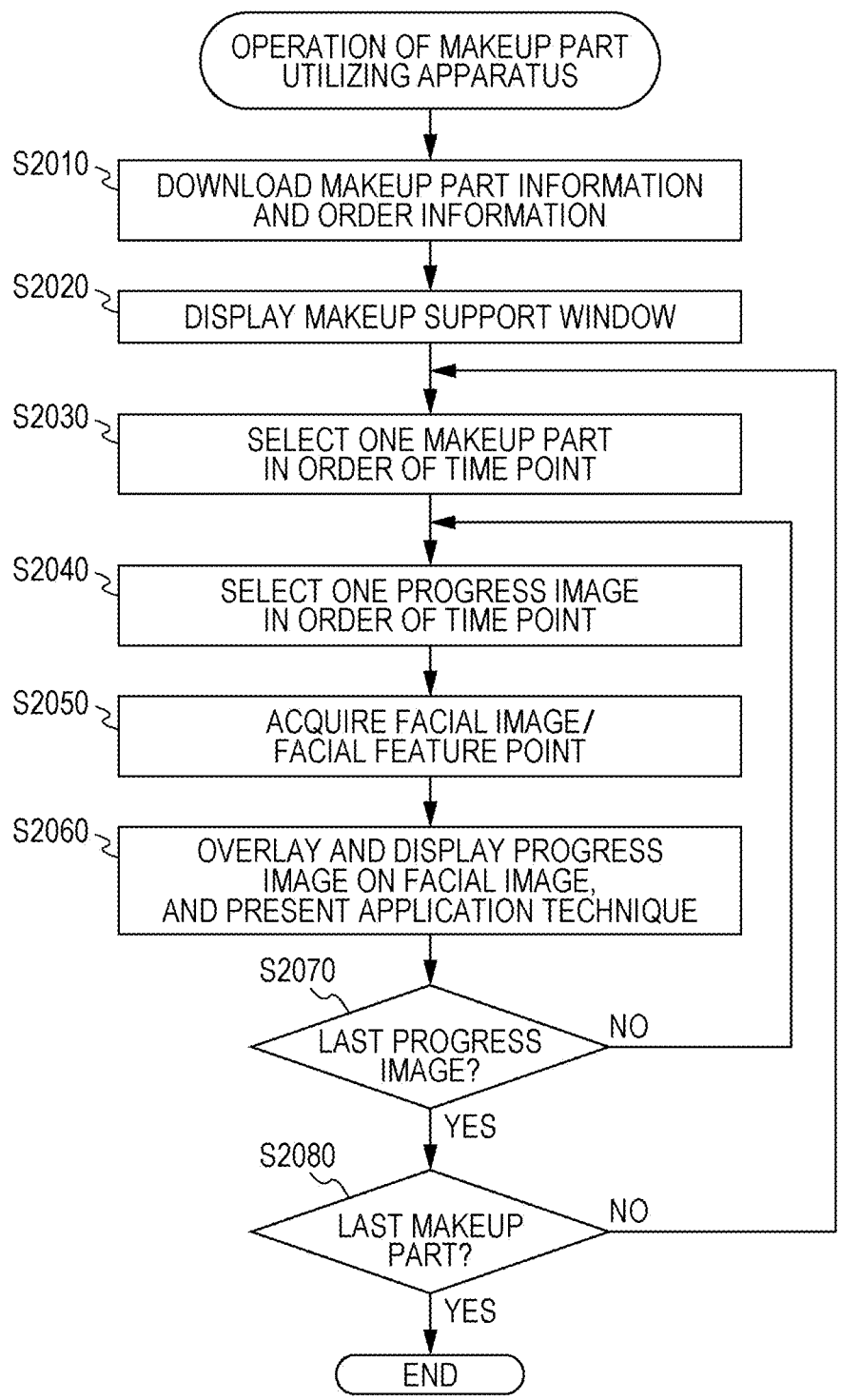
FIG. 15 is a diagram showing a flowchart showing an exemplary operation of the makeup part utilizing apparatus according to the present exemplary embodiment.

FIG. 15 is a flowchart showing an exemplary operation of makeup part utilizing apparatus 400.

In step S2010, makeup part acquiring unit 440 downloads, from information server 300, the makeup part information (part information 610 and time-series information 620; see FIGS. 13 and 14) for one makeup set.

In step S2020, makeup information presenter 450 starts to display a makeup support window described later.

In step S2030, makeup information presenter 450 refers to order information 613, and selects, in the order of time point, one makeup part (part ID 611) from the makeup set indicated by the makeup part information (see FIG. 13).

In step S2040, makeup information presenter 450 refers to time point 621, and selects, in the order of time point, one progress image 622 from time-series information 620 of the currently selected makeup part (see FIG. 14).

In step S2050, facial image acquiring unit 430 picks up a facial image, and acquires an image which is obtained by horizontally inverting the picked up facial image in the manner of a mirror image (hereinafter, such an image will be referred to as "facial image"), and also, acquires (detects) a facial feature point from the acquired facial image.

In step S2060, makeup information presenter 450 overlays and displays currently selected progress image 622 on the facial image. Furthermore, makeup information presenter 450 displays a brush image at a position where makeup is to be applied, according to brush information 623, and also, presents an application technique of a cosmetic by displaying a text or outputting an audio according to guidance information 624. Additionally, makeup information presenter 450 presents, to the user, a range where application is to be finally performed, by displaying navigation part image 616 of the currently selected makeup part based on positional information 617 (see FIGS. 13 and 14).

In step S2070, makeup information presenter 450 determines whether or not the currently selected progress image is the last progress image (at the last time point) of the currently selected makeup part. In the case where the currently selected progress image is not the last progress image (S2070: NO), makeup information presenter 450 returns to step S2040, and proceeds to the process for the next progress image. In the case where the currently selected progress image is the last progress image (S2070: YES), makeup information presenter 450 proceeds to step S2080.

In step S2080, makeup information presenter 450 determines whether or not the currently selected makeup part is the last makeup part (at the last time point) in the makeup set. In the case where the currently selected makeup part is not the last makeup part (S2080: NO), makeup information presenter 450 returns to step S2030, and proceeds to the process for the next makeup part. In the case where the currently selected makeup part is the last makeup part (S2080: YES), makeup information presenter 450 ends the series of processes.

Additionally, makeup information presenter 450 desirably adjusts the timing of returning to step S2030, based on the time interval information described above.

Furthermore, makeup information presenter 450 may receive, from the user, setting of a repetition time interval for when repeating the processes from steps S2040 to S2070, and setting of a time interval for returning to step S2030. That is, the drawing speed at makeup part generating apparatus 200 for a makeup part or a makeup set and the navigation speed at makeup part utilizing apparatus 400 for the corresponding makeup part or makeup set may be different from each other.

Furthermore, makeup information presenter 450 may receive, from the user, an operation for pausing or restarting reproduction of time-series data of the progress image and the makeup technique.

By such an operation, makeup part utilizing apparatus 400 may present, according to the makeup part information, a makeup simulation image that reproduces the drawing operation (drawing technique) of a makeup part image.

Makeup Support Window

Figure 16:
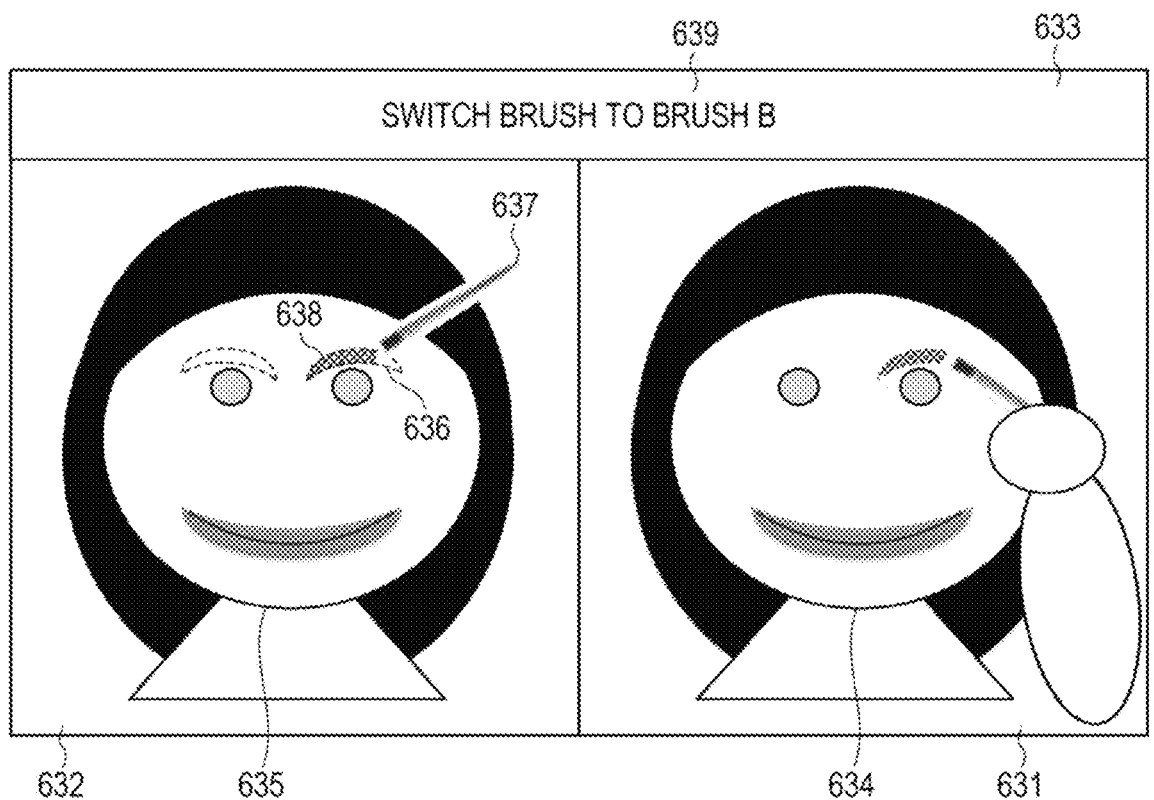
FIG. 16 is a plan view showing an example of a makeup support window according to the present exemplary embodiment.

FIG. 16 is a plan view showing an example of the makeup support window.

As shown in FIG. 16, makeup support window 630 includes mirror image displaying region 631, simulation displaying region 632, and guidance displaying region 633. In this case, a display state at a timing when the progress image at second time point $t_2$ mentioned above is selected is shown.

Makeup information presenter 450 displays, in mirror image displaying region 631 substantially in real time, video 634 which is obtained by horizontally inverting a picked up facial video in the manner of a mirror image (hereinafter, such a video will be referred to as "facial video").

Makeup information presenter 450 displays, in simulation displaying region 632, a makeup simulation image which uses facial image 635. That is, makeup information presenter 450 displays, in simulation displaying region 632, an image obtained by overlaying, on facial image 635, images indicated by the makeup part information, i.e., navigation part image 636, brush image 637 the position of which changes from moment to moment, and progress image 638 the size of which changes from moment to moment.

Makeup information presenter 450 displays, in guidance displaying region 633, additional information of the makeup simulation image. That is, makeup information presenter 450 displays guidance information 639, which changes from moment to moment.

That is, makeup information presenter 450 overlays and displays progress image 638 on facial image 635 in a time-series manner, and also, presents the makeup technique (brush image 637 and guidance information 639) in a time-series manner in conjunction with display of progress image 638.

Additionally, makeup information presenter 450 may display, in simulation displaying region 632, a video which is obtained by overlaying navigation part image 636, brush image 637, and progress image 638 on a facial video (moving image). In this case, makeup part generating apparatus 200 repeats the processes of steps S2040 to S2070 in FIG. 15 in synchronization with the facial video. Moreover, the progress image has to be recorded at a granularity allowing synchronization with a moving image frame of the facial video.

A user follows such a makeup technique presented on makeup support window 630, and starts drawing an eyebrow with a wide brush at a timing corresponding to first time point $t_1$, and keeps applying the makeup with the brush until a timing corresponding to second time point $t_2$, for example. Then, the user switches to a slim brush, and may apply the makeup after second time point $t_2$. During such a cosmetic application task, the user may intuitively apply makeup by adjusting the manner of application of makeup in accordance with navigation part image 636.

In this manner, makeup part utilizing apparatus 400 enables a user to more precisely reproduce makeup indicated by the makeup part image generated by makeup part generating apparatus 200.

Effects of Present Exemplary Embodiment

As described above, in the present exemplary embodiment, makeup part generating apparatus 200 includes drawing receiver 230 that receives a drawing operation of a makeup part image that is to be overlaid on a facial image, and information acquiring unit 240 that acquires, at each time point in a process of the drawing operation, the progress image and the drawing technique. Makeup part generating apparatus 200 also includes information processor 250 that records/outputs the makeup part information including, in a time-series manner, the image information indicating the progress image, and the technique information indicating at least one of the drawing technique and the makeup technique that is an application technique of a cosmetic corresponding to the drawing technique.

Furthermore, makeup part utilizing apparatus 400 includes facial image acquiring unit 430 that acquires a facial image, and makeup part acquiring unit 440 that acquires the makeup part information for each time point in the process of a drawing operation of a makeup part image, the makeup part information including, in a time-series manner, the image information indicating the progress image, and the technique information indicating the drawing technique or the makeup technique. Makeup part utilizing apparatus 400 also includes makeup information presenter 450 that overlays and displays the progress image on the facial image in a time-series manner, and presents the makeup technique in a time-series manner in conjunction with display of the progress image, based on the makeup part information acquired.

Makeup support system 100 thus enables more precise reproduction of makeup indicated by a makeup part image. For example, drawing reproduction of a makeup part taking the pen pressure at the time of makeup part generation can be performed, and fine makeup navigation can be performed with respect to the usability of a makeup application tool or the like.

More specifically, makeup support system 100 is suitably used by an individual to copy makeup by a professional, or by an inexperienced makeup artist or trainee to learn makeup by a professional, or by a sales assistant at a cosmetics shop to apply makeup on a customer, for example.

Example Modification of Makeup Technique

Additionally, the makeup technique to be presented is not limited to the examples described above. For example, makeup part generating apparatus 200 may acquire, and record as the makeup technique, the pen movement (touch, speed, acceleration, etc.) at each time point of operation of a virtual drawing tool, or the type of a cosmetic (cosmetic item brand name, product name, etc.).

Furthermore, the manner of conversion of the pen pressure information to the makeup technique is not limited to the examples described above. For example, makeup part generating apparatus 200 may convert a detected pen pressure to the number of times of application by using pen-pressure/number-of-times conversion information 550 and number-of-times/application-tool conversion information 560 (see FIGS. 9 and 10), and may record the result as the makeup technique. In this case, makeup part utilizing apparatus 400 is capable of presenting to a user the number of times of application of a cosmetic.

Furthermore, information about the pen movement may include the part of a virtual drawing tool that comes into contact (touches) with the touch panel, or the degree of tilt, the movement speed, acceleration information or the like of the virtual drawing tool at the time of performing drawing by moving the virtual drawing tool which is in contact with the touch panel. Additionally, the part of the virtual drawing tool is a part, of a tip end portion of the virtual drawing tool, that is in contact with the touch panel, and is different for a case where a touch is perpendicularly performed on the touch panel at the tip end portion and for a case where a touch is obliquely performed, for example. For example, a 6-axis accelerometer may be mounted on the virtual drawing tool so that the virtual drawing tool can acquire the above-described information, and makeup part generating apparatus 200 may be informed of the information.

Furthermore, contents of the makeup technique and the method for presenting the contents are not limited to the examples described above. For example, makeup part utilizing apparatus 400 may present one or some of the navigation part image, the brush image, and the guidance. Moreover, makeup part utilizing apparatus 400 may output the guidance by audio.

Example Modification of Information Conversion

Additionally, conversion of the drawing technique of a makeup part image to information to be presented to a user, that is, to the makeup technique, which is an application technique of a cosmetic, may be performed by information server 300 or makeup part utilizing apparatus 400. Furthermore, the process of removing unnecessary information and the process of editing the order may also be performed by information server 300 or makeup part utilizing apparatus 400. In these cases, makeup part generating apparatus 200 includes, in the makeup part information, the drawing technique (pen pressure, etc.) instead of the makeup technique (type of makeup application tool, etc.). Information server 300 or makeup part utilizing apparatus 400 is to include the function of information processor 250 of makeup part generating apparatus 200, and to perform the processes which are described above to be performed by information processor 250.

Furthermore, makeup part generating apparatus 200, information server 300, or makeup part utilizing apparatus 400 may perform the process of removing unnecessary information and the process of editing the order after performing conversion to the time-series information of a makeup technique.

Furthermore, makeup part generating apparatus 200, information server 300, or makeup part utilizing apparatus 400 may determine information to be presented, based on information about a user of makeup part utilizing apparatus 400.

For example, if a user only has a slim brush even though use of a wide brush is specified by the makeup part information, makeup part utilizing apparatus 400 detects such a situation, and presents a makeup technique indicating an increase in the number of times of over-painting (stroke). Moreover, for example, makeup part utilizing apparatus 400 receives, from a user, a change in the color, shape, size, denseness or the like of the makeup part image.

Furthermore, if a user does not have a cosmetic of a color specified by the makeup part information, makeup part utilizing apparatus 400 detects such a situation, and proposes use of a cosmetic of a similar color, or displays a progress image in a similar color. Makeup part utilizing apparatus 400 determines a similar color based on a distance in a color space (such as RGB), for example.

Moreover, the expression of a same user is greatly different between when the user's eyes are open and when the eyes are closed. Normally, the makeup part image is generated using a facial image with open eyes. However, actual makeup is sometimes applied with eyes closed. Accordingly, makeup part utilizing apparatus 400 desirably generates and displays a makeup simulation image for both a facial image with open eyes and a facial image with closed eyes. These different images may be simultaneous displayed on two windows, or may be displayed by being switched between each other by a user operation.

At this time, at makeup part generating apparatus 200 or makeup part utilizing apparatus 400, makeup drawn on one of the face with open eyes and the face with closed eyes may be drawn in conjunction on the other face. In this case, automatic drawing on a different expression is enabled by performing re-mapping, based on a drawn facial feature point (facial feature point where the eyes are open), in correspondence with a facial feature point on the other facial image where drawing is not performed (i.e., corresponding facial feature point where the eyes are closed).

Furthermore, images of a plurality of patterns of expression of the same person (for example, an expression with open eyes and an expression with closed eyes) may be recorded in advanced. At the time of makeup part generation, an image of an expression including feature points by which part images combined on a face look most natural may be selected from images automatically drawn on respective expressions, and the feature points may be recorded. Furthermore, there may be a positional shift depending on the expression of a person, and thus, part images which are combined on a face may be displayed in parallel on a plurality of faces/expressions, and feature points which achieve the most natural look may be recorded.

Moreover, for example, makeup part utilizing apparatus 400 may acquire, from the facial image of a user, facial features such as the arrangement, sizes, shapes and the like of facial parts, and may perform display while finely adjusting the progress image or the like based on individual differences in the facial features.

For example, whether or not makeup indicated by each makeup part image looks good depends on the feature of the face of a user. For example, a makeup design that looks good is different depending on facial features such as the width of the eye, single eyelid/double eyelid, the color of the skin, sizes and shapes of facial parts, and whether or not the face is deeply sculptured, and attributes such as age. Accordingly, information server 300 desirably prepares makeup part information for each facial feature, such as makeup for a person with a round face and makeup for a person with a square face, acquires the facial feature of a user of makeup part utilizing apparatus 400, and selects and proposes or provides appropriate makeup part information. At this time, a plurality of makeup part images with similar makeup concepts, or makeup part images obtained by finely adjusting a base makeup part image according to facial features may be taken as a makeup part group (variations) where the images have an interchangeable relationship, and such a relationship may be held as attribute information.

Furthermore, each makeup part utilizing apparatus 400 may edit (arrange) the makeup part information. In this case, for example, information server 300 collects, from each makeup part utilizing apparatus 400, contents of editing which have been digitized based on a predetermined rule, and the facial feature of a user as the target of editing and other attributes. Information server 300 analyzes the collected information, determines an editing rule for makeup part information, and provides or proposes editing contents suitable for the facial feature and attribute of a user to each makeup part utilizing apparatus 400. Accordingly, sharing also of experience and knowledge of a user who has edited the makeup part information is enabled. Moreover, information server 300 may also analyze which makeup part image has been selected and determine a selection rule for the makeup part information, and may provide or propose editing contents suitable for the facial feature or attribute of a user.

Example Modification of Makeup Part Information

The makeup part information may further include information which would be useful when performing a search at a later time. For example, such information may be makeup artist (worker), date/time, place, customer, cosmetic item which has been used (cosmetic item selected from color pallet), makeup item, season (cosmetic product release timing), and the like. Moreover, such information may be the facial feature and attribute (color preferred by a user, or the like) of a user, past recommendation history, sales performance of a makeup part, sales performance of each designer who generated makeup parts, and the like. For example, information server 300 may generate ranking information of sales performance of designers, and provide the information to makeup part utilizing apparatus 400.

Example Modification Regarding Sharing

The manner of sharing of makeup part information generated by makeup part generating apparatus 200 is not limited to the example described above. For example, makeup part generating apparatus 200 sends an URL (Uniform Resource Locator) for accessing a storage location of the makeup part information to a user of makeup part utilizing apparatus 400 by an email, and makeup part utilizing apparatus 400 accesses such an URL.

Example Modification of User Interface

A description will now be given of a user interface (UI) function which can be installed on the makeup part generating apparatus according to the exemplary embodiment described above, and which is for supporting generation (drawing operation) of a makeup part image by a user.

The task of generating a makeup part is burdensome, and particularly, in the step of drawing a makeup part image, a suitable virtual drawing tool (such as a brush) and a permitted drawing operation are different depending on the type of a makeup part (such as an eyebrow or a blusher) being generated. Accordingly, it is burdensome for a user to constantly bear the above in mind while performing the task.

In view of the above problem, the present disclosure aims at providing a user interface which increases a task efficiency by enabling a user who is to generate a makeup part to intuitively perform a task.

First, operations of related functions in the present disclosure will be roughly described with reference to FIG. 2 described above.

Drawing receiver 230 receives a drawing operation, drawing menu selection or the like from a user. Information acquiring unit 240 further includes a function of acquiring information about the type of a makeup part a user is currently working on, and the virtual drawing tool such as a brush being selected by the user. Information processor 250 manages the current state of drawing receiver 230 based on the information, acquired by information acquiring unit 240, about the makeup part currently being worked on. Furthermore, information processor 250 refers to information held by generation-side information storage unit 220, and performs control regarding display of a menu or an icon according to the current state of drawing receiver 230, a menu selection prohibition process, or the like.

Generation-side information storage unit 220 further holds information about the virtual drawing tool such as a brush to be used at the time of a makeup drawing task (hereinafter, such information will be referred to as "preset brush information"). Generation-side information storage unit 220 further holds information describing a series of processing tasks necessary for generating a makeup part image (hereinafter, such information will be referred to as "macro part generation information").

A description will be given below of display of a brush, a menu, and the like according to the type of a part being worked on.

First, a case is assumed where a user generates a makeup part image by using makeup part generating apparatus 200. A detailed description will be given of display of an icon of a virtual drawing tool (brush) according to the makeup part being worked on (which is selected by the user).

Details of the preset brush information held by generation-side information storage unit 220 will be given below.

1) Type of Related Part

A type of the related part is the type of a makeup part where the brush is to be used (such as eyebrow or blusher).

2) Brush Shape

A brush shape is information indicating the shape (and use) of a brush. Specifically, the brush shape may be an eyeshadow airbrush, a circular eyeshadow brush, a blusher airbrush, a circular blusher brush, a mascara brush (for right, for left), or the like. Moreover, brushes of the same type may be further divided according to use into various types, such as eyebrow brush 1 (slightly wide), eyebrow brush 2 (slightly slim), eyebrow brush 3 (slim), mascara brush 1 (slightly curved), mascara brush 2 (moderately curved), mascara brush 3 (greatly curved), and the like.

3) Size

A size is a drawing size in the case of performing drawing using the brush, the size being expressed in pt (points).

4) Drawing Style

A drawing style is information indicating a drawing method of each selected brush, including information as to whether the pen pressure corresponds to the size or the opacity, for example.

5) Icon Image

An icon image is an icon image for displaying a virtual drawing tool such as a brush on a drawing window. The icon image includes images (or link information thereto) obtained by iconizing a cosmetic application tool, such as a brush, to be used at the time of actually applying makeup on a person, and by iconizing the shape of makeup (such as mascara) to be drawn by the brush. Additionally, the brush image described with reference to FIG. 7 and the like is information to be used at the time of reproduction at the utilizing apparatus, and may be the same or different from the image currently described that is to be displayed at the generating apparatus.

6) Relationship between Direction of Brush and Flow of Hair

Figure 17A:
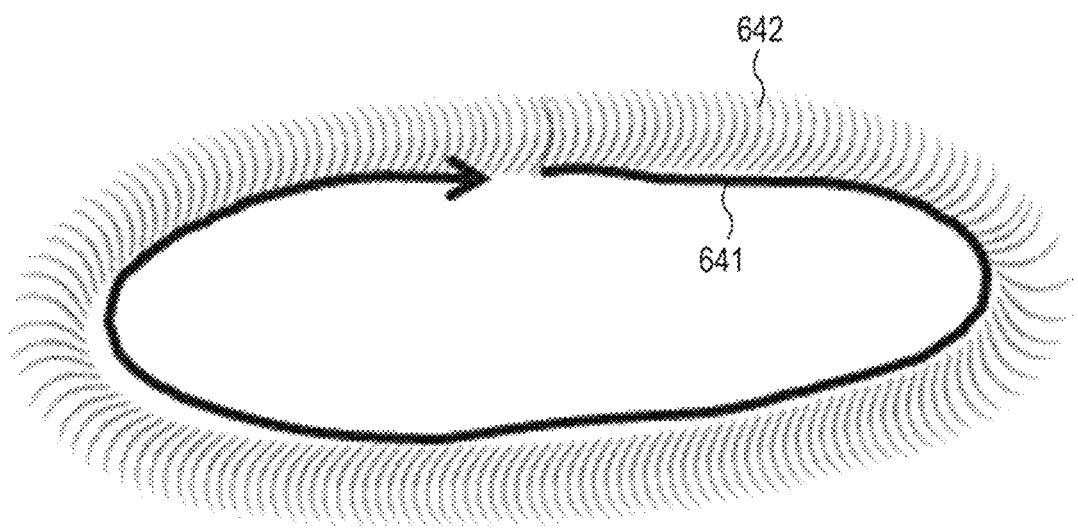
FIG. 17A is a diagram showing an example of drawing which uses a mascara brush according to the present exemplary embodiment.
Figure 17B:
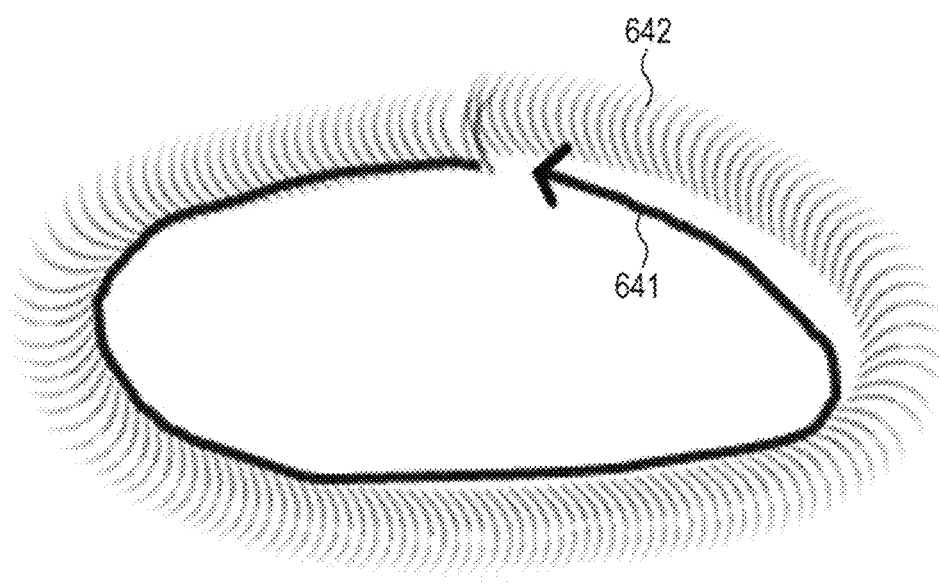
FIG. 17B is a diagram showing another example of drawing which uses a mascara brush according to the present exemplary embodiment.

A relationship between the direction of brush and the flow of hair is information indicating the relationship between the direction of movement (pen movement, stroke) of a brush at the time of drawing and the direction of flow of hair to be drawn. For example, in the case of an eyebrow, display is performed in such a way that the hair flows in a manipulation direction of the brush. In the case of eyelashes, the direction of hair is a protruding direction, and as shown in FIGS. 17A and 17B, a large number of eyelashes are drawn in an unbroken manner in such a way that the eyelashes stand out in manipulation direction 641 of the brush.

Information processor 250 displays selectable brushes as a menu on drawing receiver 230, based on the current state of drawing receiver 230 and by referring to the preset brush information in generation-side information storage unit 220. Furthermore, an icon of the virtual drawing tool (such as a brush) according to the selected makeup part (which is being drawn) is displayed in a drawing area.

For example, in the case of drawing a makeup part for eyeshadow, an image of an eyeshadow airbrush in the preset brush information is displayed as a cursor icon, for the virtual drawing tool, as a pointing device. Furthermore, in the case of drawing a makeup part for eyelashes, an image of a mascara brush in the preset brush information is displayed as a cursor icon, for the virtual drawing tool, as a pointing device.

By holding various pieces of information managed by brush presetting as attributes of the virtual drawing tool such as a brush, complex setting of drawing parameters may be simplified.

Furthermore, generation-side information storage unit 220 holds a drawing region for each type of each makeup part. When a makeup part of a specific type is selected, even if a user tries to draw outside a drawing region specified by the type of the makeup part, drawing receiver 230 is controlled and such an input is ignored. Drawing may thus be prevented from being erroneously performed in a region which is unrelated to the makeup part being worked on.

Next, a description will be given of an example operation which uses information (macro part generation information) describing a series of processing tasks (actions) necessary for generation of a makeup part image.

As described above, generation-side information storage unit 220 further holds information (macro part generation information) describing a series of processing tasks necessary for generation of a makeup part image.

An example of the macro part generation information is described below.

1) Masking Process for Generation of Binarized Data
2) Addition of Multiplication Process Attribute at the time of Combining
3) Addition of Special Effect (Pattern)

1) Masking Process for Generation of Binarized Data

To facilitate change of color of a makeup part at a later time, the makeup part generating apparatus of the present disclosure separates colors used at the time of drawing of a makeup part image, and records a binarized image of the makeup part. A masking process is a process for separating and holding a binary image obtained by removing color (RGB) information selected by a user at the time of drawing of the makeup part image. Specifically, in the case where image data having a layered structure is held, a layer of the binary image and a layer of color are separately held, and the binary image may be easily displayed or recorded by masking the layer of color. The makeup part generating apparatus holds the macro part generation information in advance for the process necessary to generate a makeup part, and thus, a step necessary for makeup part generation can be skipped without making the user clearly conscious of the binarization process.

2) Addition of Multiplication Process Attribute at the Time of Combining

At the time displaying a makeup part image of a makeup part generated by a makeup part generating tool of the present disclosure by combining the makeup part image with a facial image of a user, makeup part utilizing apparatus 400 (such as makeup simulator) desirably performs natural combining such that the skin color, which is different for each user, is matched. When a multiplication process with a facial image of a user as a combining target is performed instead of combining (overlaid display) by a simple overwrite process, a makeup part image to which a multiplication process attribute is added may achieve natural combining according to which the skin color, which is different for each user, is matched. Additionally, in the case of foundation, the tone may be made lighter when a combination color is light, and darker when the combination color is dark (soft light).

3) Addition of Special Effect (Pattern)

As an example of a special effect, there is texture such as a shine of glitter, gloss, or pearl. Makeup part generating apparatus 200 in FIG. 2 generates information (macro part generation information) for displaying texture such as a shine of glitter, gloss, or pearl. In a glitter process, a pattern image showing the color and shine of gold glitter (light, deep), silver glitter (light, deep), glitter of mixed color of gold and silver (light, deep), or the like is generated, for example. In a gloss process, a pattern image showing a shine of gloss is generated for a region, of a part image, where a shine by gloss is to be applied (hereinafter, such a region will be referred to as "application target region"). Furthermore, in a pearl process, a pattern image showing the color and shine of particles finer than glitter described above is generated at an application target region of a part image. Generation-side information storage unit 220 in FIG. 2 stores these pattern images. These pattern images may be generated through drawing receiver 230, and may be input to information acquiring unit 240 or stored in generation-side information storage unit 220.

Moreover, makeup part acquiring unit 440 in FIG. 3 acquires the pattern image generated by makeup part generating apparatus 200 in FIG. 2 over a communication network or the like. Additionally, makeup part acquiring unit 440 may independently generate a pattern image instead of acquiring the pattern image over a communication network. Makeup information presenter 450 in FIG. 3 combines the pattern image showing texture such as glitter, gloss, or pearl with the application target region of a part image by performing overlay display or the like. The pattern image here is generated as an image having an a channel (opacity). For example, an operation for the case of applying a shine by a lip gloss will be described with reference to FIG. 18.

Figure 18:
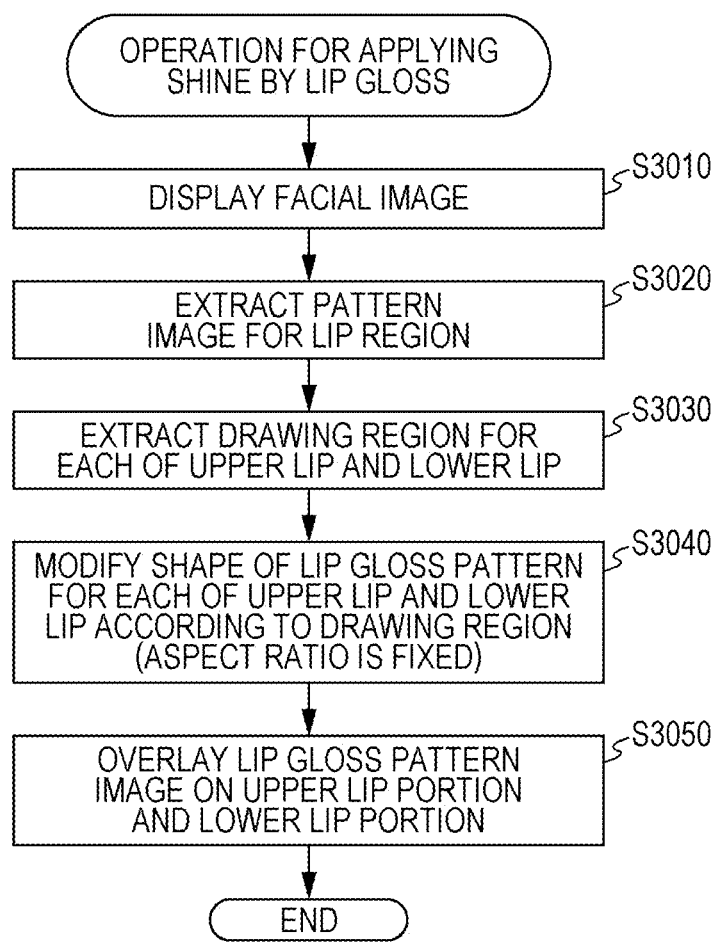
FIG. 18 is a diagram showing an exemplary operation for applying a shine by a lip gloss according to the present exemplary embodiment.

FIG. 18 is a flowchart showing an exemplary operation of makeup part utilizing apparatus 400 in FIG. 3 for applying a shine by a lip gloss.

In step S3010, makeup part acquiring unit 440 acquires a facial image from facial image acquiring unit 430, and makeup information presenter 450 displays the acquired facial image. Next, in step S3020, lip gloss pattern images, generated in advance, indicating a shine of a lip gloss on an upper lip and a lower lip, and the positions and ranges of the shine are extracted.

In step S3030, a region (drawing region) where a drawing process is to be performed is extracted for each of the upper lip and the lower lip. Specifically, an arbitrary color (RGB) is overlaid on a lip region in the original facial image, and an application target region where a shine by a lip gloss is to be applied is extracted for each region of the upper lip and the lower lip (S3030).

In step S3040, the shape of the lip gloss pattern image is modified for each of the upper lip and the lower lip by enlarging or reducing the lip gloss pattern image to match the application target region of a lip portion in the original image while maintaining the aspect ratio.

In step S3050, the lip gloss pattern image is overlaid and combined at the region of each of the upper lip and the lower lip. At the time of combining the lip gloss pattern image, the size and position of the lip gloss pattern image is matched by using the facial feature point in the application target region.

A case is described above where a shine by a lip gloss is applied, but such a case is only an example. For example, in the case of glitter for eyeshadow, glittery texture may be expressed by combining a glitter pattern image for eyeshadow with the application target region above an eyelid, as in the case of lip gloss.

As another method for expressing texture, a highlight portion in an arbitrary region in an original image may be extracted, the highlight may be emphasized, and the highlight portion may be re-combined with the region. The first method (combining of a pattern image showing the color and shine of glitter, gloss, pearl, or the like) and the second method (combining of highlight) may be independently used or may be used in combination.

Information processor 250 in FIG. 2 displays, via drawing receiver 230, a macro menu for a drawing process, based on the macro part generation information described above. Information processor 250 performs a series of processes related to makeup part drawing, based on the macro part generation information corresponding to a menu selected by a user. Information processor 250 performs a process of recording a result in generation-side information storage unit 220 or of displaying the result on drawing receiver 230.

Additionally, selection of macro part generation information as described above may be performed by information processor 250 by controlling drawing receiver 230 according to the type of a makeup part being selected (being worked on) by a user. For example, drawing receiver 230 may display only a selectable menu related to macro part generation information, or may display non-selectable menu in a grayed-out manner.

Additionally, according to a method for outputting a part image by makeup part generating apparatus 200, a combined part image combining a plurality of part images in advance may be output. For example, a plurality of eyeshadow part images are combined and output as one combined eyeshadow part image. In such a case, the combined part image is not binary images each having one set of color information, but is a color image expressing color information of the plurality of combined part images. Furthermore, a combining order is in accordance with the order information. A combination of a plurality of part images may be, instead of eyeshadow, combining of a plurality of blusher images, a combination of a foundation image and a concealer image, a combination of a part image and a pattern image (texture), and the like.

Other Example Modifications

Makeup information presenter 450 of makeup part utilizing apparatus 400 may generate, as a makeup manual (guide), information arranging, in order, information to be displayed at each makeup step at each time point in a drawing process (information corresponding to simulation displaying region 632 and guidance displaying region 633 in FIG. 16). Makeup information presenter 450 may transmit the generated makeup manual by emails, or may print out the same to be sent to a customer.

The use of makeup part utilizing apparatus 400 is not limited to the example described above. For example, makeup part generating apparatus 200 is installed at a beauty salon where a skilled cosmetician works, and makeup part utilizing apparatus 400 is installed at a beauty salon where an inexperienced cosmetician works. According to such use, an inexperienced cosmetician may be remotely supervised or trained by a skilled cosmetician with respect to a makeup skill or a customer service skill.

For example, makeup part utilizing apparatus 400 may display, as guidance, a makeup manual or information arranging, in order, information generated by a skilled cosmetician to be displayed at each makeup step. An inexperienced cosmetician may thus be remotely supervised or trained with respect to each makeup step, a makeup skill or a customer service skill, or may learn each makeup step, a makeup skill or a customer service skill on his/her own.

Furthermore, for example, makeup part utilizing apparatus 400 may cause a device for printing makeup on a face, a sheet printer for attaching makeup on a face, or a device for applying makeup on a face by spraying or the like to read a makeup manual or information arranging, in order, information to be displayed in each makeup step. That is, makeup part utilizing apparatus 400 may cause each makeup step to be automatically performed on the face of a customer by using a sheet printer, or by spraying, for example.

Still further, part of the configuration of each apparatus may be physically spaced apart from other portion of the configuration of the apparatus. In this case, the plurality of portions being spaced apart from each other must each include a communication unit for establishing communication between them. That is, for example, part of the functions of each apparatus may be cloud-based.

SUMMARY OF PRESENT DISCLOSURE

A makeup part generating apparatus of the present disclosure includes a drawing receiver that receives a drawing operation of a makeup part image that is to be overlaid on a facial image, an information acquiring unit that acquires, at each time point in a process of the drawing operation, a progress image that is an image drawn by the time point, and a drawing technique at the time point, and an information processor that records/outputs makeup part information including, in a time-series manner, image information indicating the progress image, and technique information indicating at least one of the drawing technique and a makeup technique that is an application technique of a cosmetic corresponding to the drawing technique.

Additionally, in the makeup part generating apparatus described above, the image information may include positional information indicating a position of the progress image by using a facial feature point as a reference.

Furthermore, in the makeup part generating apparatus described above, in a case where the technique information indicates the drawing technique, the drawing technique may include at least one of a type of a virtual drawing tool to be used in the drawing operation, a pen pressure at a time of operation of the virtual drawing tool, and a pen movement at a time of operation of the virtual drawing tool, and in a case where the technique information indicates the makeup technique, the makeup technique may include at least one of a type of a makeup application tool to be used in application of the cosmetic, and a number of times of over-painting of the cosmetic, where the type of the makeup application tool and the number of times of over-painting are associated in advance with at least one of the type of the virtual drawing tool, the pen pressure, and the pen movement.

Furthermore, in the makeup part generating apparatus described above, in a case where the drawing technique acquired by the information acquiring unit includes the pen pressure, the information processor may generate, based on the pen pressure, the technique information indicating at least one of the type of the makeup application tool and the number of times of over-painting.

Furthermore, in the makeup part generating apparatus described above, the information acquiring unit may determine, at the each time point, at least one of a width and a denseness of an image portion to be drawn at the time point, based on the pen pressure.

A makeup part utilizing apparatus of the present disclosure includes a facial image acquiring unit that acquires a facial image, a makeup part acquiring unit that acquires makeup part information for each time point in a process of a drawing operation of a makeup part image, the makeup part information including, in a time-series manner, image information indicating a progress image that is an image of a part drawn by the time point, and technique information indicating at least one of a drawing technique at the time point and a makeup technique that is an application technique of a cosmetic corresponding to the drawing technique, and a makeup information presenter that overlays and displays the progress image on the facial image in a time-series manner, and presents the makeup technique in a time-series manner in conjunction with display of the progress image, based on the makeup part information acquired.

Additionally, in the makeup part utilizing apparatus described above, the facial image acquiring unit may extract a facial feature point from the facial image, the image information may include positional information indicating a position of the progress image by using the facial feature point as a reference, and the makeup information presenter may determine an overlay position of the progress image on the facial image by using the facial feature point as a reference.

Furthermore, in the makeup part utilizing apparatus described above, the makeup information presenter may present the makeup technique including at least one of a type of a makeup application tool to be used in application of the cosmetic, and a number of times of over-painting of the cosmetic.

Furthermore, in the makeup part utilizing apparatus described above, in a case where the technique information acquired by the makeup part acquiring unit indicates the drawing technique but does not indicate the makeup technique, the makeup information presenter may convert the drawing technique to the makeup technique.

Furthermore, in the makeup part utilizing apparatus described above, in a case where the technique information acquired by the makeup part acquiring unit indicates a pen pressure at a time of operation of a virtual drawing tool in the drawing operation, the makeup information presenter may convert the pen pressure to at least one of the type of the makeup application tool and the number of times of over-painting.

A makeup part generating method of the present disclosure includes receiving a drawing operation of a makeup part image that is to be overlaid on a facial image, acquiring, at each time point in a process of the drawing operation, a progress image that is an image drawn by the time point, and a drawing technique at the time point, and recording/outputting makeup part information including, in a time-series manner, image information indicating the progress image, and technique information indicating at least one of the drawing technique and a makeup technique that is an application technique of a cosmetic corresponding to the drawing technique.

A makeup part utilizing method of the present disclosure includes acquiring a facial image, acquiring makeup part information for each time point in a process of a drawing operation of a makeup part image, the makeup part information including, in a time-series manner, image information indicating a progress image that is an image of a part drawn by the time point, and technique information indicating at least one of a drawing technique at the time point and a makeup technique that is an application technique of a cosmetic corresponding to the drawing technique, and overlaying and displaying the progress image on the facial image in a time-series manner, and presenting the technique information in a time-series manner in conjunction with display of the progress image, based on the makeup part information acquired.

A non-transitory computer-readable recording medium storing a makeup part generating program of the present disclosure causes a computer to execute receiving a drawing operation of a makeup part image that is to be overlaid on a facial image, acquiring, at each time point in a process of the drawing operation, a progress image that is an image drawn by the time point, and a drawing technique at the time point, and recording/outputting makeup part information including, in a time-series manner, image information indicating the progress image, and technique information indicating at least one of the drawing technique and a makeup technique that is an application technique of a cosmetic corresponding to the drawing technique.

A non-transitory computer-readable recording medium storing a makeup part utilizing program of the present disclosure causes a computer to execute acquiring a facial image, acquiring makeup part information for each time point in a process of a drawing operation of a makeup part image, the makeup part information including, in a time-series manner, image information indicating a progress image that is an image of a part drawn by the time point, and technique information indicating at least one of a drawing technique at the time point and a makeup technique that is an application technique of a cosmetic corresponding to the drawing technique, and overlaying and displaying the progress image on the facial image in a time-series manner, and presenting the technique information in a time-series manner in conjunction with display of the progress image, based on the makeup part information acquired.

The technology according to the present disclosure is useful as a makeup part generating apparatus, a makeup part utilizing apparatus, a makeup part generating method, a makeup part utilizing method, a non-transitory computer-readable recording medium storing a makeup part generating program, and a non-transitory computer-readable recording medium storing a makeup part utilizing program which enable more precise reproduction of makeup indicated by a makeup part image.

What is claimed is:
1. A makeup part generating apparatus comprising:
   a touch-panel display that receives a drawing operation of a makeup part image that is to be overlaid on a facial image, wherein the touch-panel display displays a user interface with a part image generating window including
     a facial image displaying region displaying a facial image;
     an edit target part selecting region receiving selection of a part of the displayed facial image to be edited by adding virtual makeup thereto, wherein the edit target part selecting region is a selectable list of names of different parts of the facial image to be edited by adding virtual makeup to different layers, the displayed list of names including
       an eyebrow layer, and
       a lipstick layer;
     an edit menu region receiving selection of a type of virtual makeup to be added to the displayed facial image, and
     a brush selection list region receiving selection of a virtual makeup brush by which to apply the selected type of virtual makeup; and
   a processor that acquires, at each time point in a process of the drawing operation, a progress image that is an image drawn at each time point, and a drawing technique used at the time point, wherein
     the processor also records and outputs makeup part information including, in a time-series manner, image information indicating the progress image, and technique information indicating at least one of the drawing technique and a makeup technique that is an application,
     the processor determines a number of times of application of the selected type of virtual makeup by the selected virtual makeup brush based on the selected type of virtual makeup, and the output technique information also indicates the determined number of times of application of the selected type of virtual makeup, and
     the processor controls the touch panel to also display the determined number of times of application of the selected type of virtual makeup.

2. The makeup part generating apparatus according to claim 1, wherein the image information includes positional information indicating a position of the progress image by using a facial feature point as a reference.

3. The makeup part generating apparatus according to claim 2, wherein
   in a case where the technique information indicates the drawing technique, the drawing technique includes at least one of a type of a virtual drawing tool to be used in the drawing operation, a pen pressure at a time of operation of the virtual drawing tool, and a pen movement at a time of operation of the virtual drawing tool, and
   in a case where the technique information indicates the makeup technique, the makeup technique includes at least one of a type of a makeup application tool to be used in application of the cosmetic, and a number of times of over-painting of the cosmetic, wherein the type of the makeup application tool is associated in advance with at least one of the type of the virtual drawing tool, the pen pressure, and the pen movement.

4. The makeup part generating apparatus according to claim 3, wherein, in a case where the drawing technique acquired by the processor includes the pen pressure, the processor generates, based on the pen pressure, the technique information indicating at least one of the type of the makeup application tool and the number of times of overpainting.

5. The makeup part generating apparatus according to claim 3, wherein the processor determines, at each time point, at least one of a width and a denseness of an image portion to be drawn at one of the time points, based on the pen pressure.

6. The makeup part generating apparatus according to claim 1, wherein the drawing operation is performed by a pen, the processor detects the pen pressure on the touch panel during the drawing operation, a memory stores a conversion function for each selected type of virtual makeup applied to the facial image, converting the detected pen pressure into the number of times of application of each selected virtual makeup, the processor determines the number of times of application of a selected type of virtual makeup by a selected virtual makeup brush according to the stored conversion function, based on the detected pen pressure and the selected type of virtual makeup, and outputs technique information to be displayed, indicating the determined number of times of application of the selected type of virtual makeup, and the processor controls the touch panel to display the determined number of times of application of the selected type of virtual makeup.

7. The makeup part generating apparatus according to claim 1, wherein the drawing operation is performed by a pen, the processor detects the pen pressure on the touch panel during the drawing operation, the processor determines the number of times of application of a selected type of virtual makeup by a selected virtual makeup brush based on the detected pen pressure and the selected type of virtual makeup, and outputs technique information to be displayed, indicating the determined number of times of application of the selected type of virtual makeup, and the processor controls the touch panel to display the determined number of times of application of the selected type of virtual makeup.

8. The makeup part generating apparatus according to claim 1, wherein the drawing operation is performed by a pen, the processor detects the pen pressure on the touch panel during the drawing operation, the processor determines the number of times of application of a selected type of virtual makeup by a selected virtual makeup brush based on the detected pen pressure, wherein the determination is performed according to a linear relationship between the pen pressure and the number of application of the selected virtual makeup, and the processor controls the touch panel to display the determined number of times of application of the selected type of virtual makeup.

9. The makeup part generating apparatus according to claim 1, wherein the drawing operation is performed by a pen, the processor detects the pen pressure on the touch panel during the drawing operation, the processor determines the number of times of application of a selected type of virtual makeup by a selected virtual makeup brush based on the detected pen pressure, wherein the determination is performed according to a non-linear relationship between the pen pressure and the number of application of the selected virtual makeup, and the processor controls the touch panel to display the determined number of times of application of the selected type of virtual makeup.

10. A makeup part generating method comprising:

receiving a drawing operation of a makeup part image that is to be overlaid on a facial image displayed on a touch-panel display;

displaying on the touch-panel display a user interface with
a part image generating window including
a facial image displaying region displaying a facial image;
an edit target part selecting region receiving selection of a part of the displayed facial image to be edited by adding virtual makeup thereto, wherein the edit target part selecting region is a selectable list of names of different parts of the facial image to be edited by adding virtual makeup to different layers, the displayed list of names including
an eyebrow layer, and
a lipstick layer;
an edit menu region receiving selection of a type of virtual makeup to be added to the displayed facial image, and
a brush selection list region receiving selection of a virtual makeup brush by which to apply the selected type of virtual makeup; and acquiring, at each time point in a process of the drawing operation, a progress image that is an image drawn at each the time point, and a drawing technique used at each time point; and recording and outputting makeup part information including, in a time-series manner, image information indicating the progress image, and technique information indicating at least one of the drawing technique and a makeup technique that is an application technique of a cosmetic corresponding to the drawing technique; and determining a number of times of application of the selected type of virtual makeup by the selected virtual makeup brush based on the selected type of virtual makeup, and wherein
the output technique information also indicates the determined number of times of application of the selected type of virtual makeup, and
the touch panel also displays the determined number of times of application of the selected type of virtual makeup.

11. A non-transitory computer-readable recording medium storing a makeup part generating program for causing a computer to execute:

receiving a drawing operation of a makeup part image that is to be overlaid on a facial image displayed on a touch-panel display;

displaying on the touch-panel display a user interface with
a part image generating window including
a facial image displaying region displaying a facial image;
an edit target part selecting region receiving selection of a part of the displayed facial image to be edited by adding virtual makeup thereto, wherein the edit target part selecting region is a selectable list of names of different parts of the facial image to be edited by adding virtual makeup to different layers, the displayed list of names including
an eyebrow layer, and
a lipstick layer;
an edit menu region receiving selection of a type of virtual makeup to be added to the displayed facial image, and
a brush selection list region receiving selection of a virtual makeup brush by which to apply the selected type of virtual makeup;
acquiring, at each time point in a process of the drawing operation, a progress image that is an image drawn at each time point, and a drawing technique used at each time point;
recording and outputting makeup part information including, in a time-series manner, image information indicating the progress image, and technique information indicating at least one of the drawing technique and a makeup technique that is an application technique of a cosmetic corresponding to the drawing technique; and
determining a number of times of application of the selected type of virtual makeup by a the selected virtual makeup brush based on the selected type of virtual makeup, wherein
the output technique information also indicates the determined number of times of application of the selected type of virtual makeup, and
the touch panel also displays the determined number of times of application of the selected type of virtual makeup.

12. A makeup part utilizing apparatus comprising:
a video camera that acquires a facial image;
a processor that acquires makeup part information for each time point in a process of a drawing operation of a makeup part image, the makeup part information including, in a time-series manner, image information indicating a progress image that is an image of a part drawn at each time point, and technique information indicating at least one of a drawing technique used at each time point and a makeup technique that is an application technique of a cosmetic corresponding to the drawing technique; and
a display that overlays and displays the progress image on the facial image in a time-series manner, and presents the makeup technique in a time-series manner in conjunction with display of the progress image, based on the acquired makeup part information,
wherein the display simultaneously displays
a mirror image displaying region showing a video image of a user's face in real time obtained with the video camera,
a simulation displaying region showing a makeup simulation image of the facial image with makeup thereon obtained from the makeup part information acquired by the processor and overlaying and displaying the progress image on the facial image, and
a guidance displaying region displaying guidance messages to the user about how to apply makeup to the user's face in the same manner as in the displayed makeup simulation image,
wherein the mirror image displaying region and the simulation displaying region are separately displayed simultaneously in different portions of the display, whereby the user is enabled to compare in real time the application of makeup to the user's face in the mirror image displaying region with the application of makeup in the makeup simulation image, and
wherein the guidance displaying region displays a number of times each cosmetic is to be applied to a user's face by a predetermined cosmetics brush to achieve a predetermined denseness in each cosmetic applied to the user's face as indicated in the acquired makeup part information.

13. The makeup part utilizing apparatus according to claim 12, wherein
the camera extracts a facial feature point from the facial image,
the image information includes positional information indicating a position of the progress image by using the facial feature point as a reference, and
the display determines an overlay position of the progress image on the facial image by using the facial feature point as the reference.

14. The makeup part utilizing apparatus according to claim 13, wherein the display presents the makeup technique including at least one of a type of a makeup application tool to be used in application of the cosmetic, and a number of times of over-painting of the cosmetic.

15. The makeup part utilizing apparatus according to claim 14, wherein, in a case where the technique information acquired by the processor indicates the drawing technique but does not indicate the makeup technique, the display converts the drawing technique to the makeup technique.

16. The makeup part utilizing apparatus according to claim 15, wherein, in a case where the technique information acquired by the processor indicates a pen pressure at a time of operation of a virtual drawing tool in the drawing operation, the display converts the pen pressure to at least one of the type of the makeup application tool and the number of times of over-painting.

17. A makeup part utilizing method comprising:
acquiring a facial image;
acquiring makeup part information for each time point in a process of a drawing operation of a makeup part image, the makeup part information including, in a time-series manner, image information indicating a progress image that is an image of a part drawn by each time point, and technique information indicating at least one of a drawing technique used at each time point and a makeup technique that is an application technique of a cosmetic corresponding to the drawing technique;
overlaying and displaying the progress image on the facial image in a time-series manner, and presenting the technique information in a time-series manner in conjunction with display of the progress image, based on the acquired makeup part information; and
simultaneously displaying
a mirror image displaying region showing a video image of a user's face in real time obtained with the video camera,
a simulation displaying region showing a makeup simulation image of a facial image with makeup thereon obtained from the makeup part information acquired by the processor and overlaying and displaying the progress image on the facial image, and
a guidance displaying region displaying guidance messages to the user about how to apply makeup to the user's face in the same manner as in the displayed makeup simulation image,
wherein the mirror image displaying region and the simulation displaying region are separately displayed simultaneously in different portions of the display, whereby the user is enabled to compare in real time the application of makeup to the user's face in the mirror image displaying region with the application of makeup in the makeup simulation image, and wherein the guidance displaying region displays a number of times each cosmetic is to be applied to a user's face by a predetermined cosmetics brush to achieve a predetermined denseness in each cosmetic applied to the user's face as indicated in the acquired makeup part information.

18. A non-transitory computer-readable recording medium storing a makeup part utilizing program for causing a computer to execute:

acquiring a facial image;

acquiring makeup part information for each time point in a process of a drawing operation of a makeup part image, the makeup part information including, in a time-series manner, image information indicating a progress image that is an image of a part drawn at each time point, and technique information indicating at least one of a drawing technique at each time point and a makeup technique that is an application technique of a cosmetic corresponding to the drawing technique;

overlaying and displaying the progress image on the facial image in a time-series manner, and presenting the technique information in a time-series manner in conjunction with display of the progress image, based on the acquired makeup part information; and simultaneously displaying a mirror image displaying region showing a video image of a user's face in real time obtained with the video camera, a simulation displaying region showing a makeup simulation image of the facial image with makeup thereon obtained from the makeup part information acquired by the processor and overlaying and displaying the progress image on the facial image, and a guidance displaying region displaying guidance messages to the user about how to apply makeup to the user's face in the same manner as in the displayed makeup simulation image, wherein the mirror image displaying region and the simulation displaying region are separately displayed simultaneously in different portions of the display, whereby the user is enabled to compare in real time the application of makeup to the user's face in the mirror image displaying region with the application of makeup in the makeup simulation image, and wherein the guidance displaying region displays a number of times each cosmetic is to be applied to a user's face by a predetermined cosmetics brush to achieve a predetermined denseness in each cosmetic applied to the user's face as indicated in the acquired makeup part information.

* * * * *